United States Patent
Cullen et al.

(10) Patent No.: US 9,451,393 B1
(45) Date of Patent: Sep. 20, 2016

(54) AUTOMATED MULTI-PARTY CLOUD CONNECTIVITY PROVISIONING

(75) Inventors: Patrick Brigham Cullen, Herndon, VA (US); Kevin Christopher Miller, Herndon, VA (US); Marwan S. Oweis, Olney, MD (US)

(73) Assignee: Amazon Technologies, Inc., Reno, NV (US)

( * ) Notice: Subject to any disclaimer, the term of this patent is extended or adjusted under 35 U.S.C. 154(b) by 354 days.

(21) Appl. No.: 13/555,360

(22) Filed: Jul. 23, 2012

(51) Int. Cl.
*H04W 4/02* (2009.01)

(52) U.S. Cl.
CPC ..................................... *H04W 4/02* (2013.01)

(58) Field of Classification Search
CPC ...... H04L 67/2804; G06F 21/00; H04W 4/02
USPC ............... 709/228; 717/177, 178, 172, 173; 715/968, 826, 762
See application file for complete search history.

(56) References Cited

U.S. PATENT DOCUMENTS

| | | | |
|---|---|---|---|
| 5,444,699 A * | 8/1995 | Watanabe | 370/397 |
| 5,748,629 A | 5/1998 | Caldara et al. | |
| 5,821,875 A * | 10/1998 | Lee | H04L 49/101 340/2.21 |
| 6,097,722 A * | 8/2000 | Graham | H04L 12/5602 370/395.21 |
| 6,639,919 B2 | 10/2003 | Kroninger et al. | |
| 6,912,221 B1 * | 6/2005 | Zadikian | H04L 12/5695 370/219 |
| 7,107,312 B2 | 9/2006 | Hackbarth et al. | |
| 7,171,415 B2 * | 1/2007 | Kan et al. | |
| 7,292,577 B1 | 11/2007 | Ginipalli et al. | |
| 7,327,682 B2 | 2/2008 | Gandhi et al. | |
| 7,359,322 B2 | 4/2008 | Khurana et al. | |
| 7,577,154 B1 | 8/2009 | Yung et al. | |
| 7,596,811 B2 * | 9/2009 | Lloyd | H04L 12/2602 370/230 |
| 7,734,516 B2 | 6/2010 | Barnum et al. | |
| 7,743,001 B1 | 6/2010 | Vermeulen et al. | |
| 7,848,238 B1 * | 12/2010 | Pawar et al. | 370/235 |
| 7,873,742 B1 * | 1/2011 | Orvendal et al. | 709/236 |
| 7,921,211 B2 * | 4/2011 | Larson | H04L 29/12066 709/226 |
| 7,930,734 B2 * | 4/2011 | Foo et al. | 726/5 |
| 7,933,230 B2 | 4/2011 | Sato | |
| 7,953,869 B2 * | 5/2011 | Demmer | H04W 4/02 709/228 |

(Continued)

OTHER PUBLICATIONS

Microsoft Computer Dictionary, 5th edition, "hyperlink", "link", "path", 2002.*

(Continued)

*Primary Examiner* — Ondrej C. Vostal
(74) *Attorney, Agent, or Firm* — Robert C. Kowert; Meyertons, Hood, Kivlin, Kowert & Goetzel, P.C.

(57) ABSTRACT

Methods and apparatus for automated multi-party cloud connectivity provisioning are disclosed. A system includes resources of a provider network, and a connectivity coordinator. The coordinator collects network service offering metadata of a plurality of connectivity providers using a first set of programmatic interfaces. In response to a connectivity query specifying connectivity parameters, the coordinator identifies, using at least a portion of the metadata, a collection of one or more connectivity providers of the plurality of connectivity providers capable of providing connectivity between a client network and a provider network endpoint in accordance with the connectivity parameters. In response to a connectivity establishment request, the coordinator initiates, using another programmatic interface, an activation of a network connection between the client network and a selected provider network endpoint.

25 Claims, 9 Drawing Sheets

(56) References Cited

U.S. PATENT DOCUMENTS

| | | | |
|---|---|---|---|
| 7,970,903 B2 | 6/2011 | Oeda | |
| 8,018,955 B2* | 9/2011 | Agarwal | H04W 4/02 370/235 |
| 8,077,726 B1* | 12/2011 | Kumar | H04L 45/22 370/395.31 |
| 8,644,296 B1* | 2/2014 | Croak et al. | 370/352 |
| 8,762,501 B2* | 6/2014 | Kempf | H04L 12/4633 709/220 |
| 2001/0022837 A1 | 9/2001 | Vasell et al. | |
| 2002/0067735 A1* | 6/2002 | Lindstrom | H04Q 11/04 370/422 |
| 2003/0074443 A1 | 4/2003 | Melaku et al. | |
| 2003/0123446 A1* | 7/2003 | Muirhead | H04L 12/4641 370/392 |
| 2003/0188175 A1* | 10/2003 | Volk et al. | 713/191 |
| 2003/0236745 A1 | 12/2003 | Hartsell et al. | |
| 2004/0031030 A1* | 2/2004 | Kidder et al. | 717/172 |
| 2004/0076151 A1* | 4/2004 | Fant et al. | 370/389 |
| 2004/0210663 A1* | 10/2004 | Phillips | H04L 67/1008 709/230 |
| 2004/0261114 A1* | 12/2004 | Addington | H04L 41/5051 725/106 |
| 2006/0013240 A1* | 1/2006 | Ma et al. | 370/401 |
| 2006/0031486 A1* | 2/2006 | Miner | G06F 17/0864 709/224 |
| 2006/0123079 A1* | 6/2006 | Sturniolo | H04W 80/045 709/203 |
| 2006/0203719 A1* | 9/2006 | Kim | H04L 12/14 370/227 |
| 2007/0067424 A1 | 3/2007 | Raciborski et al. | |
| 2007/0135109 A1 | 6/2007 | Walter et al. | |
| 2007/0280253 A1* | 12/2007 | Rooholamini et al. | 370/395.2 |
| 2007/0282879 A1* | 12/2007 | Degenkolb et al. | 707/101 |
| 2008/0168510 A1* | 7/2008 | Small et al. | 725/100 |
| 2008/0205399 A1* | 8/2008 | Delesalle | H04L 29/12009 370/392 |
| 2008/0276085 A1 | 11/2008 | Davidson et al. | |
| 2008/0298374 A1 | 12/2008 | Rhoades et al. | |
| 2009/0046583 A1* | 2/2009 | Towster | H04L 41/0896 370/232 |
| 2009/0070235 A1 | 3/2009 | Mehta et al. | |
| 2009/0112735 A1 | 4/2009 | Viehmann et al. | |
| 2009/0172174 A1* | 7/2009 | Zha | H04L 12/2874 709/228 |
| 2009/0192945 A1 | 7/2009 | Perpina et al. | |
| 2009/0216889 A1 | 8/2009 | Hadi | |
| 2009/0276771 A1 | 11/2009 | Nickolov et al. | |
| 2009/0300635 A1 | 12/2009 | Ferris | |
| 2010/0027552 A1 | 2/2010 | Hill | |
| 2010/0039959 A1 | 2/2010 | Gilmartin | |
| 2010/0098045 A1* | 4/2010 | Miyazaki | 370/342 |
| 2010/0111093 A1 | 5/2010 | Satterlee et al. | |
| 2010/0125664 A1 | 5/2010 | Hadar et al. | |
| 2010/0131649 A1 | 5/2010 | Ferris | |
| 2010/0131948 A1 | 5/2010 | Ferris | |
| 2010/0195540 A1 | 8/2010 | Kerr et al. | |
| 2010/0226254 A1 | 9/2010 | Kerr et al. | |
| 2010/0226280 A1 | 9/2010 | Burns et al. | |
| 2010/0228818 A1* | 9/2010 | Han | H04L 12/281 709/203 |
| 2010/0265831 A1* | 10/2010 | Hachiya | H04L 49/3009 370/248 |
| 2010/0280934 A1 | 11/2010 | Kerr et al. | |
| 2010/0319004 A1 | 12/2010 | Hudson et al. | |
| 2010/0332262 A1 | 12/2010 | Horvitz et al. | |
| 2011/0016028 A1 | 1/2011 | Toure et al. | |
| 2011/0066752 A1 | 3/2011 | Lippincott et al. | |
| 2011/0099185 A1* | 4/2011 | Trevor | G06F 17/30861 707/756 |
| 2011/0125881 A1* | 5/2011 | Boldyrev et al. | 709/221 |
| 2011/0125921 A1* | 5/2011 | Karenos et al. | 709/240 |
| 2011/0131335 A1 | 6/2011 | Spaltro et al. | |
| 2011/0131647 A1 | 6/2011 | Sanders et al. | |
| 2011/0154212 A1 | 6/2011 | Gharpure et al. | |
| 2011/0179162 A1 | 7/2011 | Mayo et al. | |
| 2011/0231899 A1 | 9/2011 | Pulier et al. | |
| 2011/0239103 A1* | 9/2011 | Mercuri | G06F 17/30861 715/234 |
| 2012/0130873 A1 | 5/2012 | Morgan | |
| 2012/0203765 A1* | 8/2012 | Ackerman et al. | 707/722 |
| 2012/0278452 A1* | 11/2012 | Schmitz | H04L 63/0807 709/220 |
| 2013/0019018 A1* | 1/2013 | Rice | 709/226 |
| 2013/0060929 A1* | 3/2013 | Koponen et al. | 709/224 |
| 2013/0061208 A1* | 3/2013 | Tsao | G06F 9/44 717/121 |
| 2013/0080999 A1* | 3/2013 | Yang | G06F 11/3664 717/124 |
| 2013/0086657 A1* | 4/2013 | Srinivasan et al. | 726/6 |
| 2013/0136138 A1* | 5/2013 | Miller et al. | 370/395.53 |
| 2013/0155865 A1* | 6/2013 | Xu | H04L 43/0894 370/237 |
| 2013/0156093 A1 | 6/2013 | Vonog et al. | |
| 2013/0246563 A1* | 9/2013 | Cardozo | G06F 17/30876 709/217 |
| 2013/0247034 A1* | 9/2013 | Messerli | G06F 9/45533 718/1 |
| 2013/0268666 A1* | 10/2013 | Wilson | H04L 63/08 709/225 |
| 2013/0332555 A1* | 12/2013 | Gabriel | H04L 67/1095 709/208 |
| 2014/0006951 A1* | 1/2014 | Hunter | 715/719 |
| 2014/0123266 A1* | 5/2014 | Carbou | H04L 63/0227 726/13 |
| 2014/0201528 A1* | 7/2014 | Krig | H04L 67/22 713/168 |

OTHER PUBLICATIONS

Rajasekar et al., "MySRB & SRB—Components of a Data Grid", 2002.*
Microsoft Computer Dictionary, "path", "physical network", 2002.*
Network Visualization—Network Admission Control Deployment Guide (2007).Cisco Systems, Inc. pp. 1-14.
Rekhter, et al.; "A Border Gateway Protocol 4 (BGP-4)"; Standards Track; The Internet Engineering Task Force (IETF); Jan. 2006; Copyright (C) The Internet Society (2006); 105 pages; retrieved from Internet: http://tools.ietf.org/pdf/rfc4271.pdf.
U.S. Appl. No. 13/306,775, filed Nov. 29, 2011; "Interfaces to Manage Direct Network Peerings"; Miller, et al.
U.S. Appl. No. 13/330,449, filed Dec. 19, 2011; "Differential Bandwidth Metering for Networks With Direct Peerings"; Furr, et al.
U.S. Appl. No. 13/330,438, filed Dec. 19, 2011; "Dynamic Bandwidth Management Using Routing Signals in Networks With Direct Peerings"; Miller, et al.
U.S. Appl. No. 13/335,465, filed Dec. 22, 2011; "Interfaces to Manage Inter-Region Connectivity for Direct Network Peerings"; Doane, et al.
U.S. Appl. No. 13/335,490, filed Dec. 22, 2011; "Interfaces to Manage Service Marketplaces Accessible Via Direct Network Peerings"; Miller, et al.
U.S. Appl. No. 13/306,801, filed Nov. 29, 2011; "Interfaces to Manage Last-Mile Connectivity for Direct Network Peerings"; Miller, et al.

* cited by examiner

*700*

Connectivity Center Home Page https://<website>.com

Dear John Doe, Welcome to Connectivity Center!

Just provide your connectivity requirements below, ← 703
submit the form, and get your configuration
instructions in seconds!

| Client network location where you need the connection: | Street | | ← 705 |
| | City, State, Zip, Country | | |
| | CLLI code (if available) | | |

| Provider network location to which connection is desired (if known) | ⦿ You select the optimal direct connect site | ← 707 |
| | ○ Enter address/CLLI code here | |

| Desired bandwidth (Gbps): | 1 Gbps (default) | ← 709 |

| When, and for how long, do you need the connection? | For <u>six months</u>, starting <u>as soon as possible</u> (click links to change) | ← 711 |

| Click <u>here</u> to enter more requirements (e.g., latency, high availability, isolation) | ← 713 |

| Maximum price per GB of data transfer | US$ 0.05 | ← 715 |

| I already have an account with these network service providers; can I use them? | Enter provider name(s) and your account number(s) | ← 717 |

SUBMIT ← 719

*FIG. 7*

AUTOMATED MULTI-PARTY CLOUD CONNECTIVITY PROVISIONING

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several regions or even countries, and may include numerous data centers with varying levels of services and facilities available, utilized together to provide a unified set of services to their end customers.

In some data centers that have been set up to provide computing and/or storage facilities to remote clients, the set of computational resources at the data center may be dynamically divided into resource pools, with each pool being made available for exclusive use by a given client for designated periods of time. There are a number of alternatives available for how the consumers of these facilities establish network connectivity to the resource pools that have been designated for their use. The customer requests may originate from a wide variety of devices—desktop personal computers, laptops, client-office servers, tablets, smart phones and the like. These devices may use either long-lasting network links (e.g., using a client office network with a T1 connection) to communicate with their proximate private network and/or the public Internet, or they may have transient connectivity (e.g., in the case where the customer uses a mobile smart phone). The proximate networks to which the customer devices are directly connected may in turn route request traffic to the provider network's data centers over a wide variety of paths. Such paths in many cases may have somewhat unpredictable performance, reliability and security characteristics.

For some types of service requests, such as a request from a customer to read a recent news article from a web-based news provider, a reasonable variation in responsiveness and an occasional dropped connection may be acceptable. However, for many business-related data transmissions, such as stock quote services and stock purchase order services provided by online stock traders, or for high-bandwidth software package deployments originating at a software development center, more stringent performance, reliability and security needs may exist. In such environments, a customer of the provider network may need a greater level of network isolation and control than is generally available over the public Internet. For example, the customer may wish to establish, if possible, dedicated physical paths between the customer's own network and the provider network, such that the only traffic transmitted over those paths is traffic generated on behalf of the customer and in accordance with policies established by the customer. Depending on the physical locations of various client network devices, it may not be easy for the client to discover, on its own, how best to establish such connections. Furthermore, to meet quickly changing business needs, customers may want the ability to enable, modify (e.g., by changing maximum supported bandwidth or other characteristics) and disable connections between the customer network and the provider network dynamically and with a minimum of effort and delay.

BRIEF DESCRIPTION OF DRAWINGS

FIG. 7 illustrates a portion of an example web-based interface that may be implemented to allow clients to submit connectivity queries, according to some embodiments.

Figure 1:
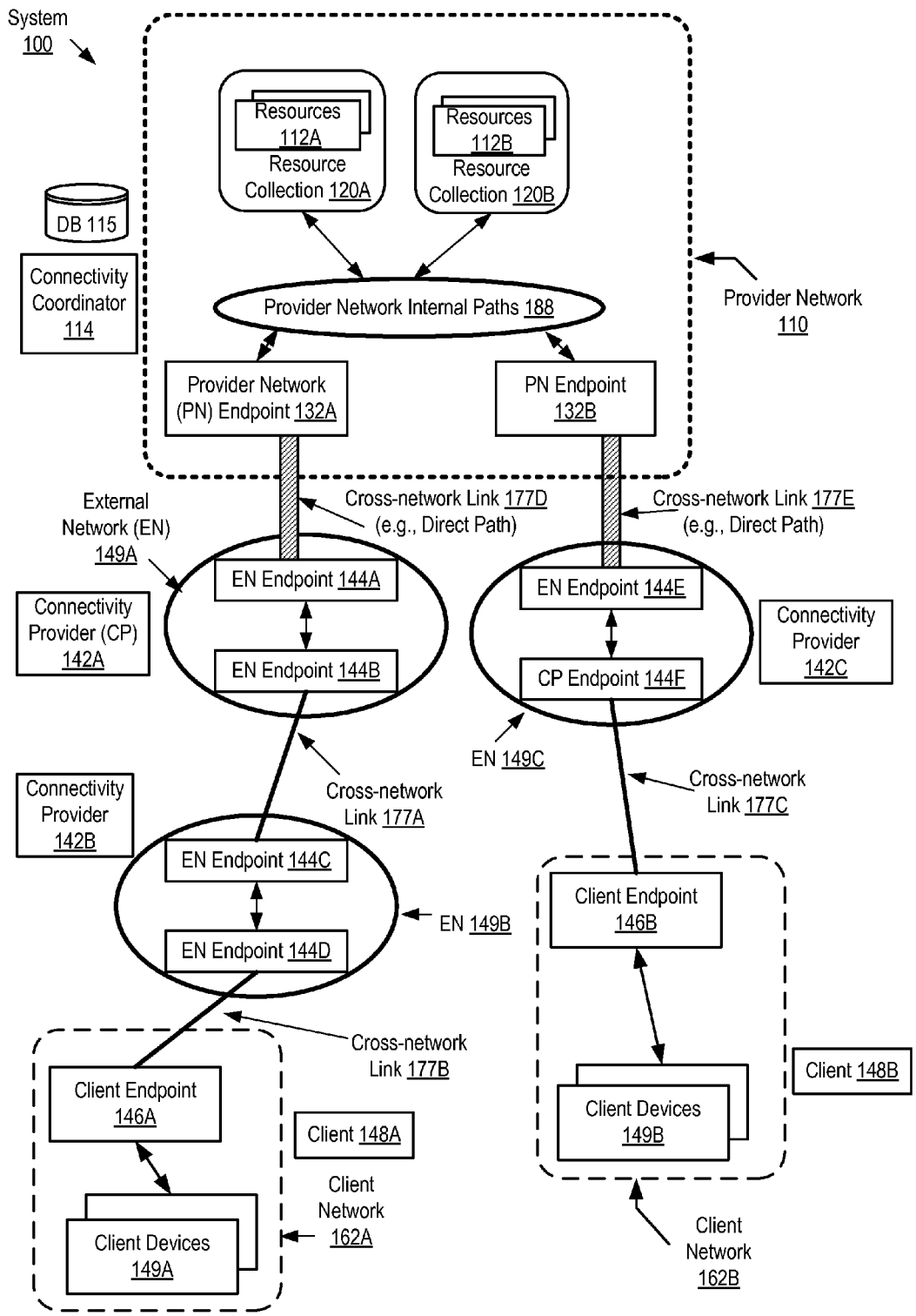
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for supporting automated multi-party cloud connectivity provisioning are described. Networks set up by an entity such as a company or a public sector organization to provide one or more services accessible via the Internet and/or other networks to a distributed set of clients may be termed provider networks in this document. The services may include a core set of infrastructure-related services such as provision of computing platforms or storage platforms, as well as more advanced services that are built using the core services, such as for example database services, load balancing services, application deployment services, search services and the like. Such a provider network may include numerous data centers, each comprising potentially large numbers of computing platforms or devices, such as collections of physical and/or virtualized computer servers, storage devices, networking equipment and the like, needed to implement and distribute services offered by the provider. In some provider networks, resources configured on the platforms may in some embodiments be offered for reservation by (and allocation to) clients in units called "instances," such as virtual or physical compute instances or storage instances. A virtual compute instance may, for example, comprise one or more servers with a specified computational capacity (which may be specified by indicating the type and number of CPUs, the main memory size, storage device number and size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices and the like.

In order to extend the geographical areas over which its services can be accessed with desired levels of performance, reliability and security, in some embodiments an operator of a provider network may establish dedicated private network paths between its data centers and one or more endpoint devices (such as routers) that are physically located at a facility remote from the data centers. The facilities at which such endpoint devices are housed may be termed "endpoint co-location facilities" in this document, as they may sometimes house network equipment owned and/or managed by business entities other than the provider network's operator, such as by independent third-party connectivity providers or by the clients themselves. The term "endpoint" may be used herein to refer to networking devices such as routers that represent the furthest points to which a particular provider's control or ownership of network equipment extends. A network connection set up for exclusive use by a particular client using a physical link installed between a provider network endpoint and an external endpoint at an endpoint co-location facility may be termed a "direct path" or a "direct connect" connection herein. On top of the physical link installed for a direct path connection, in some embodiments multiple logically-isolated connections may be set up (e.g., to isolate network traffic of one client department from the traffic of other departments of the same client). In some implementations it may be possible for multiple logically-isolated connections from several clients to use a single direct connect physical link (e.g., a link that was set up initially at the request of one of the several clients). The provider network operator may set up one set of endpoints, from which connectivity may be established via cross-network links client-owned networks, either directly (e.g., if the client has an endpoint located in the same facility as one of the provider network endpoints) or via one or more intermediary networks owned/managed by third-party connectivity providers. Each external network, such as these intermediary networks and client-owned networks, may have its own set of designated endpoints through which inter-network connectivity is enabled in some embodiments.

Often, a client or potential client of the provider network may not be able to establish physical network connectivity with the desired characteristics (e.g., performance, availability, or isolation) to the provider network without the help of some intermediary connectivity providers, such as telecommunications (Telco) providers that have already set up networking infrastructure in the vicinity of the client's computing facilities and/or near various provider network access points. In many cases, there may be more than one intermediary (or combinations of intermediaries) that is capable of providing the desired connectivity, and it may not be straightforward for the client to ascertain what the various provider options are, or to easily compare the offerings provided by the various suitable connectivity providers. Furthermore, at least in some cases, some of the connectivity providers may traditionally have required non-automated interactions (such as setting up of service-level agreements or contracts via paper mail, or via in-person interactions) with their customers to enable desired network connectivity. Such non-automated transactions may result in long delays (such as days or even weeks) between the time that a client requests connectivity, and the time that the requested connectivity is actually made available, even in situations where the physical networking infrastructure for the desired connections is already in place.

In order to make it easier for clients of the provider network to make informed choices about connectivity establishment, and, having made such choices, to enable and/or modify the desired network connections with a minimum of delay and effort, in some embodiments a connectivity coordination service may be implemented by the provider network operator. The terms "connectivity coordinator" or "coordinator" may be used to refer to the connectivity coordination service herein. A connectivity coordinator may be configured to define, implement and/or utilize several different programmatic interfaces for connectivity management in some such embodiments. For example, one set of interfaces may be defined and supported by the connectivity coordinator, and made available to third-party connectivity providers, to upload details of their network service offerings, so that the connectivity coordinator may be able to determine appropriate combinations of candidate connectivity providers usable by a client. In some embodiments, in addition to or instead of defining its own programmatic interfaces for uploading service offering details, the coordinator may use programmatic interfaces defined or implemented by the connectivity providers to download network service offering information. Another set of programmatic interfaces may be implemented for clients to specify their connectivity goals and preferences, to submit queries to determine which combinations of third-party providers are suitable for their needs, or to browse through connectivity provider listings made available by the coordinator. In at least one embodiment, after a given client makes a decision about the providers to be used, the connectivity coordinator may also submit operational requests on behalf of the client to the appropriate set of connectivity providers. Examples of such operational requests may include connection setup/activation requests, connection termination requests, connection modification requests and the like in various embodiments. Additional programmatic interfaces (which may be termed operational interfaces) defined or implemented by the connectivity providers may be used in some embodiments by the coordinator to submit these operational requests. The services provided by a connectivity coordinator may thus include a number of different features in some embodiments, including collection, indexing and storage of network service offering metadata from numerous third-party connectivity providers, search and discovery of providers that match specified client connectivity needs, and dynamic enablement, modification and teardown of physical and/or logical network connections.

According to one embodiment, a connectivity coordinator may be configured to use a first set of programmatic interfaces to collect various types of network service offering metadata from a plurality of connectivity providers. The metadata may include, for example, geographical coverage information indicating which locations can be served by a given provider; performance parameters of the connectivity that can be supported by each provider such as bandwidth limits, latencies and the like; details of the hardware and software infrastructure supported by the providers; estimates of how long it may take for a provider to implement a requested physical or logical connection enablement; pricing policies of the provider (e.g., recurring and non-recurring charges for providing the requested connectivity); details of various programmatic interfaces that the providers support for various operations or queries, and so on. The first set of interfaces used for metadata collection may include some interfaces (such as application programming interfaces (APIs)) implemented by the connectivity coordinator, other interfaces implemented by one or more of the connectivity providers and utilized by the connectivity coordinator to submit queries to the connectivity providers, or a combination of coordinator-implemented and provider-implemented interfaces in various embodiments. The coordinator may organize, reformat or otherwise transform the network service offering metadata collected to make searches more efficient in some embodiments, e.g., using a number of techniques such as normalizing the metadata collected in different formats into a common format, indexing the metadata, and/or storing the metadata in a persistent store such as a database system. Depending on the specific connectivity provider, different protocols may be set up for ensuring that the metadata collected remains current and accurate—e.g., in some implementations, a schedule may be set up for periodically collecting the metadata, in other implementations a given connectivity provider may be responsible for notifying the coordinator when a property of a network service offering changes, and so on. In some implementations, at least some portions of the network service offering metadata may be obtained by the connectivity coordinator using e-mail messages, file transfers (e.g., via FTP (File Transfer Protocol)) and/or various other approaches.

In response to a connectivity query from a particular current or potential client, indicating one or more parameters of desired connectivity between the client's network or devices and the provider network, the connectivity coordinator may in some embodiments search through its collected network service offering metadata to find appropriate combinations of connectivity providers that appear capable of providing the desired connectivity. In some cases, e.g., upon discovering that some of the collected metadata has not been updated recently, the coordinator may dynamically refresh the information it has, by communicating with one or more of the connectivity providers after the query is received from the client. Using some combination of the previously collected metadata and/or recently refreshed metadata, the coordinator may be able to determine a set of candidate connectivity providers suitable to meet the needs indicated the client request. In some cases, a single provider may be able to provide the requested connectivity on its own, while in other cases, the coordinator may be able to find a plurality of connectivity providers that together can meet the client's needs. For example, consider a scenario where a client desires a connection between a fairly remote client location A and a provider network endpoint located at B with specified performance and pricing properties. Given these preferences, the coordinator may be able to find a pair of connectivity providers CP1 and CP2, such that the CP1 can provide connectivity with the desired characteristics from A to an intermediate location K, and CP2 can provide connectivity with the desired connectivity between K and the provider network location B. In general, the coordinator in some embodiments may be able to identify N distinct discrete segments of a network path between the client and the provider network, such that the N segments together provide the desired connectivity, and up to C different connectivity providers implement the N segments (the number of connectivity providers involved may differ from the number of discrete segments, for example because more than one segment is provided by the same provider, or because more than one provider participates in operating a given segment). The number N of distinct segments needed may vary based on the relative locations of the client's network and the provider network endpoints; e.g., for more remote client locations, more segments may be needed, while in cases where the client network happens to be fairly close to a provider network endpoint, a single segment and a single connectivity provider may suffice.

In addition to simply determining which sets of providers can individually or collectively physically connect the client network to the provider network, the coordinator may also have to take various other properties of the network service offerings of the different providers into consideration, such as pricing, performance, security, availability and the like in some embodiments. A client may include indications of various required or preferred properties in the connectivity query sent to the coordinator in some embodiments. In other embodiments, at least some of the preferences of a client may be saved beforehand, e.g., in a client profile set up by the client or by the coordinator, so that each connectivity query does not have to repeat all of the preferences and requirements. If the coordinator is able to find some connectivity providers that match the client requirements, a collection or list of candidate connectivity providers and/or candidate provider sets (i.e., groups of providers that can collectively provide the desired connectivity) may be sent to the client in some embodiments in response to the client's query. The client may then decide which if any of the candidates the client wishes to use.

If the client decides to proceed with one of the choices provided by the coordinator, in one embodiment the client may submit a connectivity establishment request back to the coordinator, indicating one selected connectivity provider, or a set of selected connectivity providers. The connectivity coordinator may then initiate, e.g., using one or more operational programmatic interfaces, an activation of a network connection between the client network and the provider network using the selected provider(s). For example, if a single connectivity provider were selected by the client, the coordinator may invoke one or more operational API calls to that provider to establish a connection between a selected client endpoint and a selected provider network endpoint. If a group of connectivity providers were selected, each responsible for a respective segment of the network path to be set up, distinct API calls may be submitted to each connectivity provider of the group in some implementations. In some embodiments, the network connection establishment may involve multiple phases—e.g., first a physical network path may have to be set up if one does not already exist, and then a logical connection may be established over the physical path. In one such embodiment, the coordinator may be responsible for ensuring that all phases are completed (e.g., by issuing respective requests to the connectivity providers for each phase, and monitoring the responses to those requests) before providing an indication to the client that connectivity has been successfully established. In at least some implementations, the coordinator may execute one or more tests to verify that the connection has been set up as specified, before informing the client that the connection has been established as requested.

In some scenarios, if for example a particular client is already utilizing some services of a connectivity provider, and the connectivity provider already serves other clients of the provider network, the physical infrastructure (e.g., various cables and network devices) that could be used to establish a connection between the particular client's network and the provider network may already be physically installed, prior to the client sending a connectivity query or connectivity establishment request. In such scenarios, in order to set up the desired connectivity, the existing infrastructure may simply have to be configured (e.g., by programmatically setting some parameters of one or more network devices) or activated (e.g., by logically or physically switching some set of devices "on"), and no new physical links may need to be established. It may be possible in some implementations for the connectivity coordinator to ascertain whether the physical infrastructure is already in place, and to inform the client if it is. For example, in one implementation the client may provide an account identifier to the connectivity coordinator, indicating that the client has a previously-established account set up with a specified connectivity provider. The account identifier may be included in the client's connectivity query in one embodiment, or may be provided to the coordinator as part of a different interaction in a different embodiment. Using the provided account identification (or any other identification information, such as for example the client's name, business premise location details, or office location), the connectivity coordinator may in some implementations be able to determine from the specified connectivity provider whether any new physical links need to be set up, or whether existing links will suffice for the desired connectivity. In some such embodiments, if the existing infrastructure is sufficient, the coordinator may inform the client that only a logical connection enablement is required (which may result in a much faster turnaround time for the client); while if the existing physical infrastructure is insufficient, the coordinator may inform the client that a physical network path is to be established, or a new network device brought online, before a logical network connection can be activated to enable the requested connectivity.

After a connection is established to the client's satisfaction, in some embodiments the connectivity coordinator may provide additional management and/or administrative functions for the connection to the client. For example, the client's connectivity needs and/or budget may change over time. The coordinator may allow the client to submit connection modification requests, e.g., indicating that a different bandwidth capacity is required, or that some other property of the connection needs to change. In one implementation, if the client were previously paying a particular amount for the connection (e.g., US$ X per gigabyte of data transfer, for example), and now wishes to pay less (e.g., US$ Y per gigabyte), the client may submit a request to the connectivity coordinator to determine what options are available for the new pricing constraint. Using its knowledge of the network service offerings of the various providers, and the various operational APIs, the connectivity coordinator may make a best effort to implement the requested changes, or (e.g., in the changed pricing constraint scenario) to come up with options for the client to consider. For example, to change the bandwidth capacity, the coordinator may submit one or more API-based requests to the connectivity providers currently in use, and determine based on the response whether the change is feasible and what the pricing implications, if any are. The client may be informed if there are any pricing changes associated with the bandwidth change, and if the pricing changes are acceptable, one or more additional API requests may be sent to implement the change. To determine what options the client may have in the pricing constraint change scenario, in some embodiments the coordinator may once again consult its collected network service offering metadata to find candidate combinations of providers that the client may now be able to use. Instead, or in addition, the coordinator may contact the currently-used providers (e.g., again using APIs) to determine the best possible performance that can be obtained by the client given the new pricing constraint, and inform the client of the supportable performance. The coordinator may thus serve as an intelligent intermediary between the client and the connectivity providers, trying to match the client's changing needs as best as possible to the capabilities of the providers. Various other aspects of the connectivity coordinator's services are described below in further detail.

Example System Environment

FIG. 1 illustrates an example system environment, according to at least some embodiments. The system 100 comprises a provider network 110 with a plurality of resources (e.g., virtual or physical compute or storage resources, networking devices and the like) 112, such as resources 112A and resources 112B. The resources 112 may be organized into resource collections 120 allocated to respective clients 148 of the provider network, e.g., a particular client 148A may have resource collection 112A allocated to it, while a different client 148B may have resource collection 120B allocated to it. (It is noted that the term "client" may be used broadly herein to refer at least to (a) entities that currently do not yet have, but wish to obtain, services or resources from the provider network 110, and (b) entities that are already using some services from the provider network, or have some resources of the provider network allocated to them.) The resources 112 may be distributed among a plurality of data centers of the provider network 110 in some embodiments, and the data centers themselves may be located in various different geographical regions. To avoid clutter, data center boundaries and region boundaries are not shown in FIG. 1. Each client 148 may have a corresponding client network 162 that includes a plurality of client devices 149 (which may also include any combination of various computing devices, storage devices, network devices and the like). For example, in FIG. 1, client 148A has client devices 149A in client network 162A, while client 148B has client devices 149B in client network 162B.

In the depicted embodiment, each client 148 may be able to establish network connectivity between its client network 162 and the resources of provider network 110 using one or more intermediary connectivity providers 142, such as connectivity providers 142A, 142B or 142C. Each of the connectivity providers may operate their own external network (EN) 149—e.g., connectivity provider 142A operates EN 149A, connectivity provider 142B operates EN 149B, and connectivity provider 143C operates EN 149C, and at least some of the connectivity providers 142 may be able to collectively or individually provide cross-network links connecting the client networks 162, various intermediary external networks 149, and the provider network 110. The establishment of client connectivity to the provider network 110 may be facilitated by connectivity coordinator 114 in the illustrated embodiment. For example, the connectivity coordinator 114 may gather network service offering information from the connectivity providers 142, describing the features of the respective offerings, such as supported bandwidth levels, security protocols, pricing policies and the like. Connectivity coordinator 114 may use various programmatic interfaces—e.g., either interfaces defined/implemented by the coordinator and used by the connectivity providers 142 to upload the network service offering information, or interfaces defined/implemented by the connectivity providers 142 and invoked by the coordinator 114, or both types of interfaces—to gather the network service offering information in different embodiments. The gathered network service offering information or metadata may be processed (e.g., by normalizing metadata obtained from the different connectivity providers into a common format), and/or stored in an efficiently-searchable persistent database 115 in some embodiments. In at least one embodiment, a number of indexes may be maintained for the collected network service offering metadata, to enable fast searches based on frequently-encountered client query criteria.

The connectivity coordinator 114 may define and/or implement a set of client-accessible programmatic interfaces (such as APIs, web pages, graphical user interfaces, or command-line tools) allowing clients 148 to submit connectivity-related requests and queries in the embodiment depicted in FIG. 1. For example, in one embodiment a web site may be set up to allow prospective or current clients to submit connectivity queries specifying various properties or parameters of desired network connections between a client network 162 and the provider network 110. Using such a web interface, a client 148 may for example indicate physical locations (e.g., via a street address, zip code, or Common Language Location Identifier (CLLI) code) of client network facilities from which connectivity is desired, performance characteristics (such as supported bandwidth or latency), availability characteristics, pricing constraints or preferences, and the like. In some implementations a client 148 may specify the client premise or facility location, and allow the connectivity coordinator 114 to determine which provider network endpoint locations are best suited for providing the desired connectivity; in other embodiments, the client 148 may specify not only the client endpoint location(s) but also a preferred provider network endpoint location to which connectivity is desired. In response to a connectivity query indicating one or more client connectivity parameters, the connectivity provider 114 in the depicted embodiment may provide, using at least a portion of the network service offering metadata it has collected, an indication of a collection of one or more connectivity providers 142 that are capable of providing the desired connectivity indicated by the query parameters. In some scenarios the connectivity provider 114 may need to refresh its network service offering metadata for one or more of the connectivity providers 142, after the query is received, before providing the enumeration to the requesting client 148.

In the illustrated embodiment, for example, in response to a connectivity query from client 148A with parameters indicating that connectivity between client network endpoint 146A and the provider network 110 is desired, the set of candidates indicated by the connectivity coordinator 114 may include the combination of connectivity providers 142B and 142A. The set of candidates listed in response to a different connectivity query from client 148B may include the provider 142C. In order to identify the set of candidate connectivity providers, the connectivity coordinator 114 may have to search in its network service offerings metadata collection for providers 142 that have indicated that they offer the appropriate geographical coverage to operate a set of network segments that collectively link the client's endpoint (such as endpoint 146A of client 148A) to a provider network endpoint (such as 132A), with properties that match all the desired connectivity parameters specified in the query. In the case of client 148A, for example, connectivity provider 142B's network service offering metadata may indicate that provider 142B can set up a cross-network link 177B to connect client endpoint 146A to an endpoint 144D of provider 142B's network, and another cross-network link 177A from provider 142B's endpoint 144C to an endpoint 144B of connectivity provider 142A; and provider 142A's metadata may indicate that connectivity from an endpoint 144A of provider 142A's network to a provider network endpoint 132A can be set up using another cross-network link 177D (such as the illustrated direct path link). Similarly, for client 148B 's query, connectivity provider 142C's network service offering metadata may indicate that a cross-network link 177C can be set up between client 148B' s endpoint 146B and one of provider 142C's endpoints (144F), and that another cross-network link such as direct path 177E can be used to connect endpoint 144E to a provider network endpoint 132B. In at least some embodiments, the network service offering metadata may not include some details about the internal network links within some or all of the external networks 149—e.g., although high-level information such as supported bandwidth and/or endpoint-to-endpoint latency may be provided by the connectivity providers 142, internal routing information, network device vendors and other details may not be provided in the metadata gathered by the connectivity coordinator 114. In other embodiments, such internal details may also be included in the metadata. It is noted that although FIG. 1 shows direct path links (177D and 177E) being used for connecting to the provider network endpoints 132A and 132B, in at least some embodiments other types of cross-network links may be used.

In some embodiments, depending on the volume of provider network service data gathered and the way it is organized, the connectivity coordinator 114 may perform iterative search steps to determine the candidate set of providers corresponding to a given client connectivity query. For example, in a first step, a set of providers that have geographic coverage for the specified location(s) may be identified, then in a second step, the supported bandwidth for each of the providers found in the first step may be checked to see of the client's requested bandwidth can be supported, and so on. A query optimizer may be used in some embodiments to identify the most efficient sequence of search steps to be taken. In at least some implementations, if not all the requirements specified by a client 148 in a connectivity query can be met by any of the combinations of providers 142 that the coordinator 114 is able to analyze within a specified time threshold, the coordinator may provide the closest set of candidate providers that it can find. E.g., in one such implementation, if a client specifies ten desired connectivity criteria in a query, and the connectivity coordinator 114 is only able to find one set of providers (CP1 and CP2 collectively) that meet eight of the criteria and two sets of providers that each meet seven of the criteria (e.g., (CP3 and CP4 collectively), and CP5 individually), the coordinator 114 may notify the client that the best three candidates sets that could be identified are (CP1, CP2), (CP3, CP4), and CP5, with details about which desired criteria could not be met by each candidate set. In some embodiments, clients 148 may designate some connectivity parameters in their queries as being mandatory, while others may be designated as non-mandatory, and the coordinator 114 may take these designations into account when determining feasible candidates.

After a client 148 receives a list or enumeration of candidate connectivity providers, the client 148 may choose one of the candidates and send a connectivity establishment request to the connectivity coordinator 114 in some embodiments, e.g., using one of the programmatic interfaces implemented by the coordinator. In response to the connectivity establishment request, the connectivity coordinator may initiate, e.g., using a set of operational programmatic interfaces implemented by the selected connectivity provider(s), an activation of a network connection between the client network 162 of the client 148 and the provider network 110, such that the connection utilizes the network service offerings of the selected candidate connectivity provider(s). In some scenarios, the connectivity may have to be established in multiple phases—e.g., first one or more physical links may have to be physically connected, then the links may be activated or switched on, and then logical connections may be established. In other scenarios, depending for example on the whether the client network is already physically linked to the appropriate connectivity provider network 149, and on the extent to which the connectivity providers' operations are automated, it may be possible to activate the desired connectivity in a single step. In some embodiments, the connectivity coordinator 114 may be responsible for informing the client 149 of the various phases to be implemented and the approximate schedules for completing the various phases, issuing appropriate requests to the connectivity providers 142 involved, and verifying that all the phases are completed successfully. In some implementations, one or more service-level agreements (indicating for example the performance and other connection characteristics promised to the client, and the price the client is required to pay) may be entered into by the relevant parties (e.g., the client 148, the set of connectivity providers 142, and the operator of provider network 110) before client traffic is allowed to flow over the network path(s) that are established.

After connectivity with the desired characteristics is activated, the client 148 may in some embodiments continue to use one or more interfaces implemented by the connectivity coordinator 114 to perform additional administrative tasks. For example, if at some point the client 148 wishes to change some of the connection parameters (such as the bandwidth limit, the availability characteristics, or the maximum price it is willing to pay), a connection modification request may be sent to the connectivity coordinator 114 via one of the interfaces. The coordinator 114 may determine, using the network service offering metadata it has already collected, or using new queries transmitted to the appropriate connectivity providers based on the requested changes, whether the desired changes can be implemented, and if so, what impact (if any) the changes will have on the service level agreements in place. If the changes are feasible, the coordinator 114 may inform the client of any pricing or other SLA impacts, and if the client agrees to proceed, the requested changes may be initiated by the coordinator, e.g., using operational programmatic interfaces of the connectivity coordinators. In some embodiments, the coordinator 114 may also be responsible for acting as a billing intermediary between the clients 148 and the connectivity provider(s) 142—e.g., the coordinator may collect billing statements from the providers for the use of their services, combine/collate the charges in a desired format, and provide a consolidated billing statement to the client. In some embodiments the consolidated billing statement may exclude details of the individual providers' billing amounts—e.g., to the client 148, it may not be of interest as to how the total billing amount is distributed among the various providers involved, so such details may be omitted from the billing statement provided to the client.

Network Service Offering Metadata Collection

Figure 2:
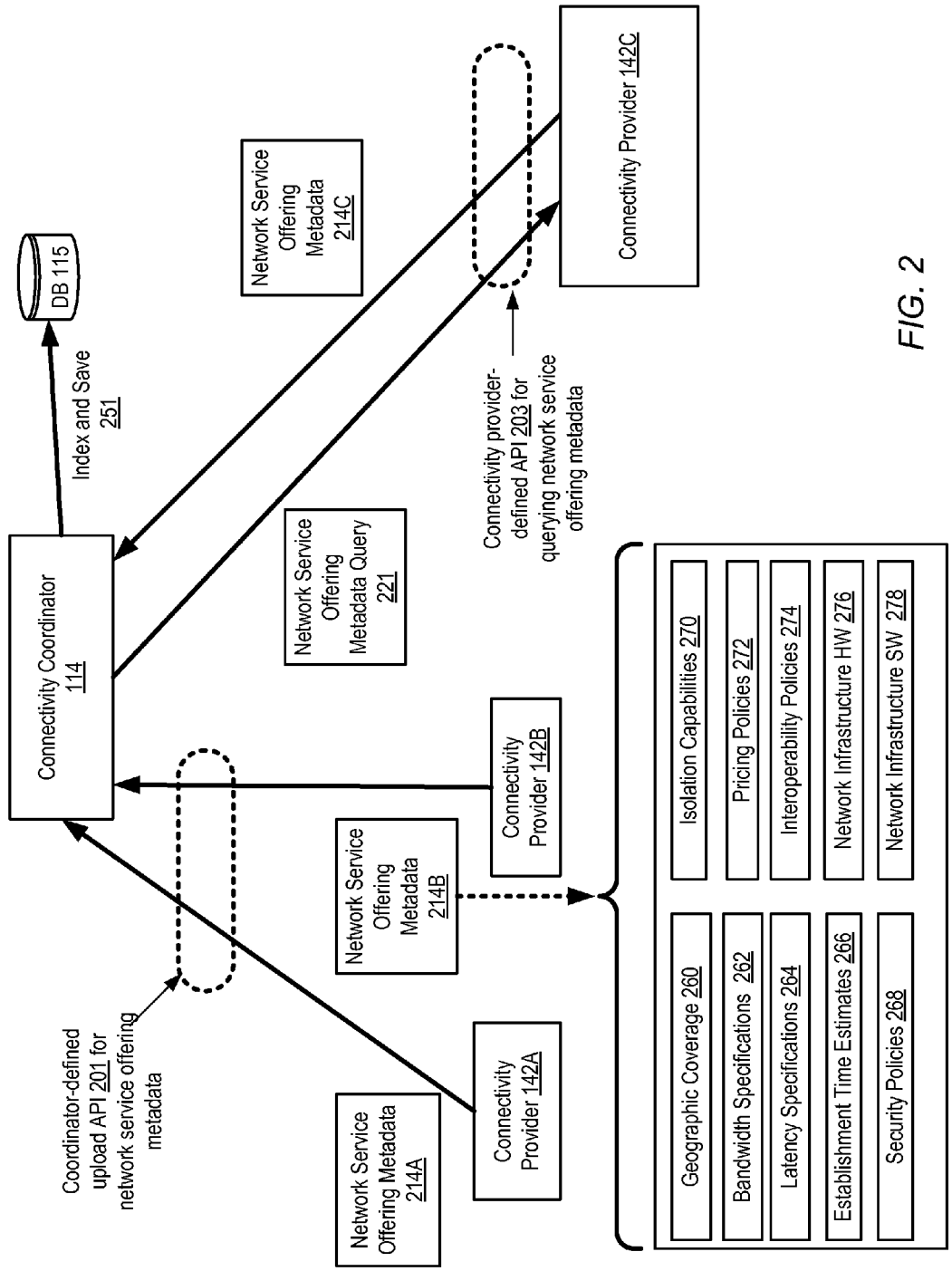
FIG. 2 illustrates example interactions related to the collection of network service offering metadata, between a connectivity coordinator and connectivity providers, according to at least some embodiments.

FIG. 2 illustrates example interactions related to the collection of network service offering metadata, between a connectivity coordinator 114 and connectivity providers 142, according to at least some embodiments. In the illustrated embodiment, the connectivity coordinator uses two different sets of programmatic interfaces for metadata collection—a coordinator-defined upload API 201, and a connectivity provider-defined API 203. (It is noted that the term API may be used herein to refer to a collection comprising a plurality of supported API calls; i.e., each API 201 and 203 may allow users of the API to submit any of several different requests or queries and receive responses thereto.) As shown, the connectivity coordinator 114 may define, implement and advertise an upload API 201 that may be used by interested connectivity providers such as 142A and 142B to transmit metadata 214A and 214B respectively to the coordinator 114. For example, the coordinator 114 may implement a web site where the details or specification of the API 201 are made public, or, the coordinator 114 may provide a notification of upload API details to each of a set of connectivity providers 142 with which the provider network operator may wish to partner, using e-mail or some other communication mechanism. A specification of the API 201 may list the various calls supported and indicate, for example, instructions for issuing the calls—e.g., what kinds of user accounts, if any, need to be set up; the target network address(es) or URIs (Universal Resource Identifiers) to which the API calls should be directed, the formats and data types of the API call parameters, the expected return data types or return codes (if any), and so on.

In the depicted embodiment, connectivity providers 142A and 142B may be willing to use the coordinator-defined upload API 201 to submit or "push" their offering metadata 214 (e.g., provider 142A may push metadata 214A, and provider 142B may push metadata 214B) to the connectivity coordinator 114. Another connectivity provider, 142C, may define or implement its own API 203 for interested authorized parties such as coordinator 114 to "pull" network service offering metadata, e.g., by submitting queries 221 to which the provider responds with metadata such as 214C. The connectivity coordinator 114 may thus use a combination of "push" and "pull" techniques in some embodiments to collect the information it needs to be able to respond to client connectivity queries. In some embodiments, an update protocol may be established with each connectivity provider 142, indicating for example how frequently and under what conditions the metadata from that provider is refreshed, acceptable or required intervals between successive metadata submissions (in the push scenario) or queries (in the pull scenario), and so on. In at least one embodiment, some connectivity providers 142 may also provide information about dynamically changing network conditions or trends regarding their networks (e.g., how much of the total installed bandwidth capacity is currently available for new customers) to the connectivity coordinator as part of the metadata 214 that can be collected periodically and used to respond to client queries and requests. The metadata collected may be processed (e.g., normalized into a single format), indexed, and saved to database 115 in some embodiments, as indicated by the arrow labeled 251 in FIG. 2.

Several examples of the types of constituent elements that may be included in network service offering metadata 214 in some embodiments are also illustrated in FIG. 2. As shown, network service offering metadata 214 from connectivity provider 142B may include, for example, geographic coverage information 260 indicating locations from which and/or to which the provider can operate network connections. The location information may be provided in any of various formats and granularities in different embodiments—e.g., using postal codes, CLLI identifiers, street addresses, graphical coverage maps, and the like. The metadata 214 may also include several different types of performance specifications in different embodiments, such as bandwidth specifications 262 (e.g., the supported bandwidth expressed in any desired unit or metric, such as peak bandwidth, average bandwidth, $90^{th}$ or some other percentile) and/or latency specifications for various message sizes and end-point location combinations (e.g., the logical equivalent of "we can transfer a 4-kilobyte packet from postal code P1 to postal code P2 in less than X milliseconds").

In at least some embodiments, the metadata 214 may also include establishment time estimates 266, e.g., how long the turnaround time may be for completing various phases of connectivity activation. For example, time estimates may be provided for setting up various types of physical links/devices, for enabling or "switching on" physical links/devices, and/or for activating various types of logical connections for supported networking protocols. In some embodiments, the connectivity provider 142 may also include descriptions or details of various security policies 268 supported in the network service offering metadata (e.g., information about physical security of the network infrastructure, as well as about security-related programmatic protocols that may be employed for various types of connections).

Various connectivity providers 142 may support different types of network isolation features in some embodiments—i.e., the extent to which traffic from different clients or from different Internet Protocol (IP) address ranges can be transmitted using exclusive or unshared network paths may vary from one provider to another. Information on such isolation capabilities 270 may also be included in network service offering metadata 214 in some embodiments. The metadata 214 may also include details of various pricing policies 272 for the services of the connectivity providers 142. A given pricing policy 272 may include up-front or non-recurring charges (e.g., charges for initially setting up physical and/or logical links) as well as recurring charges (e.g., amounts to be billed to the client 148 based on the total amount of data transferred, or the rate at which data is transferred) in some embodiments. Some connectivity providers may implement dynamic pricing—e.g., the charges for data transfer may vary based on the time of day, based on the current traffic level in the provider's network, or based on supply and demand—and the pricing policy information 272 may include information on the dynamic pricing.

In at least some embodiments, a given connectivity provider 142 may indicate interoperability policies 274, describing for example the extent to which it is compatible with other connectivity providers—for example, depending on the type of networking hardware and/or protocols used, it may be easier to assemble a network connection using network segments from connectivity providers 142A and 142B than to assemble a connection using segments from 142B and 142C. In addition to technical reasons affecting interoperability or compatibility between different providers, there may also be business or competitive reasons that govern how well different providers can work together in some embodiments—for example, provider 142A may not wish to participate in network connection establishment if it involves a competitor provider 142B. In some embodiments the network service offering metadata 214 may include network infrastructure hardware information 276 (e.g., the types of physical links used, the vendors and types of network devices used) and/or networking infrastructure software information 278 (e.g., the software or firmware versions supported at various key network devices, and/or the networking protocols supported). In some embodiments, only a subset of the types of constituent elements illustrated in FIG. 2 may be included in the network service offering metadata collected from any given provider 142; in other embodiments, additional types of information not shown in FIG. 2 may be collected. In at least some embodiments, the types of metadata information collected from different providers 142 may differ—i.e., some providers 142 may release different types of metadata information than others. In one embodiment, programmatic interfaces other than APIs, or in addition to APIs, may be used for network service offering metadata collection—e.g., web pages may be set up, command-line tools may be provided, or graphical user interfaces may be implemented.

Client Connectivity Queries and Connection Establishment Requests

Figure 3:
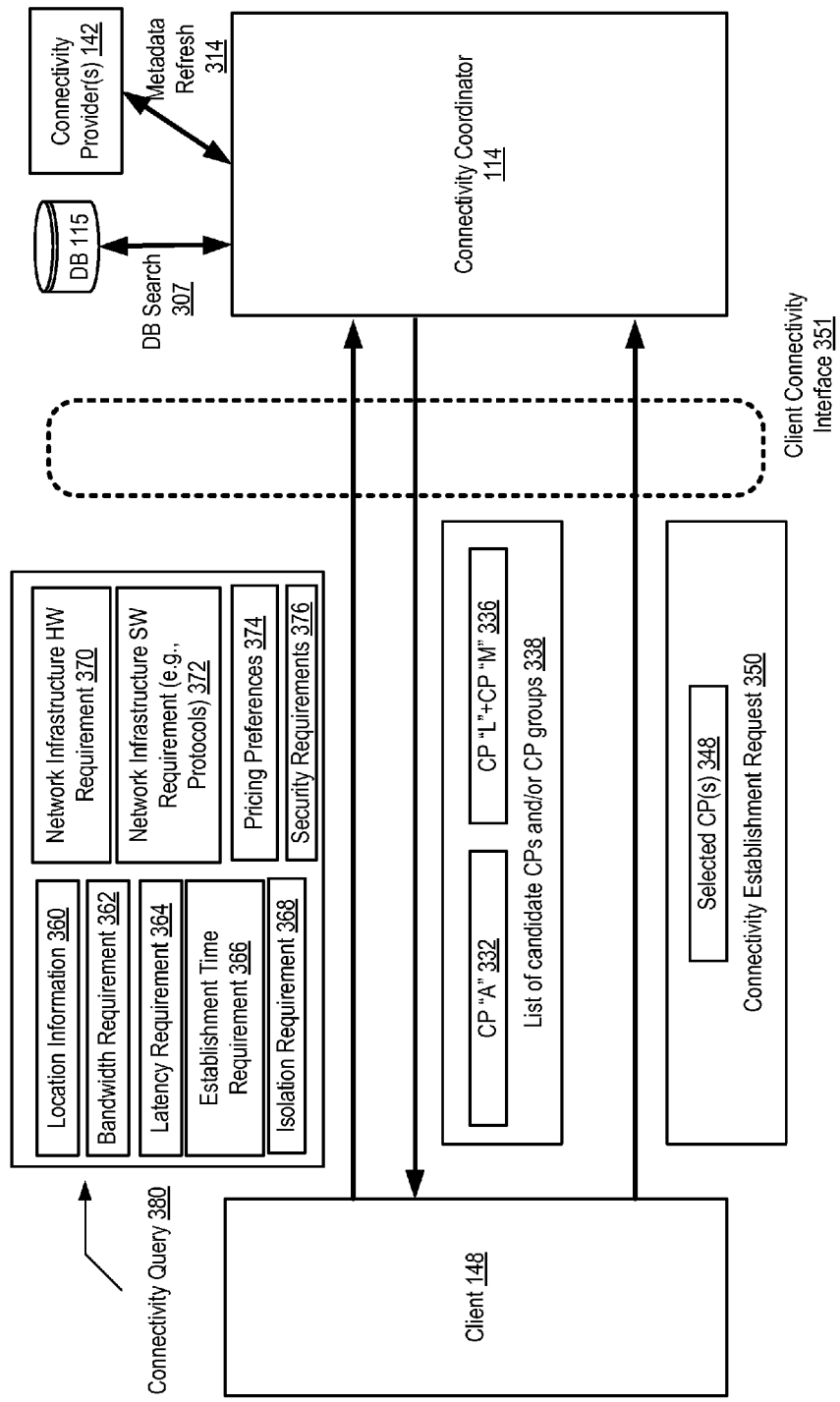
FIG. 3 illustrates examples of interactions between clients and a connectivity coordinator, according to at least some embodiments.

FIG. 3 illustrates examples of interactions between clients 148 and the connectivity coordinator 114, according to at least some embodiments. As shown, the connectivity coordinator 114 may define or implement a programmatic client connectivity interface 351. Using the interface, a client 148 may submit a connectivity query 380 to the coordinator, indicating various desired connectivity parameters or properties. The query may include location information 360 (e.g., a street address, ZIP code, or CLLI code) of the client network endpoints or client premises to be connected to the provider network. In some embodiments, the location information 360 may include a preferred provider network location as well—e.g., the client may wish to establish connectivity to a particular provider network facility (or a co-location facility where direct path physical links to the provider network endpoints are available). In one embodiment, as part of the location information 360, the client 148 may simply specify a type of location, e.g., the client may request connectivity to the nearest or most cost-effective facility that supports direct paths of the type described earlier.

The client 148 may also include a number of performance-related preferences in the connectivity query in some embodiments, such as bandwidth requirements 362 and/or latency requirements 364. In some embodiments the performance requirements may be expressed relatively simply, e.g., as single values such as "Ten gigabits per second" for bandwidth, while in other embodiments more complex performance requirements may be specified, e.g., with time-varying components such as "Ten gigabits per second sustained between 8 am and 8 pm on weekdays, and five gigabits per second between 8 pm and 9 am on weekdays, and all day on weekends". In one embodiment, the client may indicate one or more timing requirements for the connection, such as establishment time requirements 366 (e.g., a deadline by which the connectivity is to be activated) and/or a connection duration (e.g., for how long the connection is expected to be used).

In some embodiments, the connectivity query may indicate isolation requirements 368, such as whether the client is willing to share a network path or wants an exclusive or dedicated path that is not to be shared with traffic of other clients. A client 148 may also indicate preferences or requirements for specific types of networking infrastructure hardware 370 (e.g., optical cables, copper cables, specific types of routers/switches and the like) and/or networking infrastructure software 372 (e.g., specific networking protocols) in some implementations.

Clients 148 may also indicate pricing constraints or preferences 374 in their connectivity queries 380, e.g., by indicating the maximum amount they are willing to pay for the desired connections in the depicted embodiment. In some embodiments, separate pricing preferences may be provided for recurring and non-recurring pricing components. Other types of requirements, such as security requirements 376 (for physical security of networking equipment to be used for the client's connection, and/or for protocols used to ensure data security), or high-availability requirements (e.g., that redundant physical or logical paths be implemented) may also be included in the query 380 in some embodiments. Not all the types of requirements and preferences shown in FIG. 3 may be included within connectivity queries 380 in some implementations, and other requirements than those shown in FIG. 3 may be incorporated in the connectivity queries in various implementations. As noted earlier, in some embodiments, clients 148 or the connectivity coordinator 114 may set up client profiles that include default settings for various types of requirements in some implementations, so that the client 148 does not have to re-specify all the different types of information in each connectivity request 380. In at least one implementation, some of the types of elements of the connectivity query 380 shown in FIG. 3 may be designated as mandatory requirements, while others may be designated as non-mandatory or optional.

In response to the connectivity query 380, the connectivity coordinator 114 may consult its database 115 of network service offerings metadata collected from various providers 142, as indicated by the arrow labeled 307 in FIG. 3. In some implementations, the coordinator 114 may refresh its metadata information by contacting some subset or all of the connectivity providers after receiving the client's query, as indicated by the arrow labeled 314. Based on the parameters provided in the query 380 and the metadata collected from various providers 142, the connectivity coordinator 114 may generate a list or collection 338 of candidate connectivity providers (or groups of providers) that can implement a network with the characteristics indicated by the client 148. In the illustrated example, the list includes two sets of candidate providers: (a) connectivity provider "A", and (b) the group of connectivity providers "L" and "M". The list of candidates may be transmitted to the client using the same type of programmatic interface used for the query in some embodiments. After receiving the candidate list, the client 148 may select which (if any) of the candidates to use, and if the client determines to use a particular candidate or candidates, a connectivity establishment request 350 specifying the selected connectivity providers 348 may be sent to the coordinator 114. It is notes that in some implementations different types of interfaces may be used for each of the interactions shown in FIG. 3, e.g., the establishment request may be sent via e-mail in some embodiments in which the connectivity query is submitted via a web page.

Connection Activation, Modification and Termination

Figure 4:
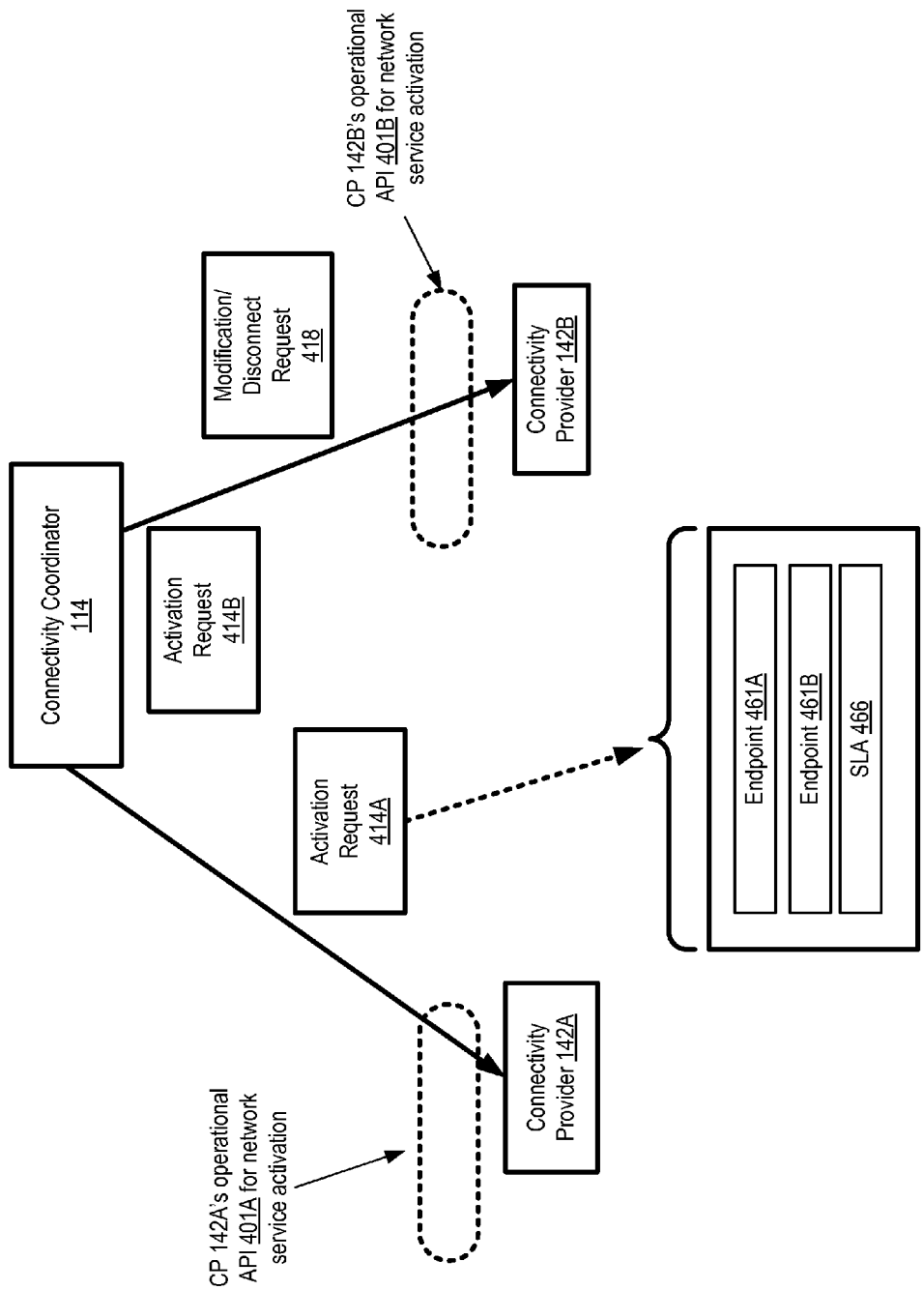
FIG. 4 illustrates example interactions related to connection activation, modification and termination, between the connectivity coordinator and various connectivity providers, according to at least some embodiments.

FIG. 4 illustrates example interactions related to connection activation, modification and termination, between the connectivity coordinator 114 and various connectivity providers 142, according to at least some embodiments. In the depicted embodiment, connectivity providers 142A and 142B each implement a respective operational API 401 (e.g., API 401A of provider 142A, and API 401B of provider 142B) to allow authorized entities such as the connectivity coordinator 114 to submit various requests associated with the setup and administration of network connections for clients 148. In some embodiments, instead of defining their own APIs, various connectivity providers 142 may choose to implement a common operational API (e.g., based on an industry standard or on a standard proposed by the connectivity coordinator 114) for managing network establishment and administration. In at least one embodiment, programmatic interfaces other than APIs (e.g., web pages, graphical user interfaces or command-line tools) may be supported by the providers 142 for network establishment and/or administration.

In response to a connectivity establishment request 350 (shown in FIG. 3) from a client 148, the connectivity coordinator 114 may submit an activation request 414 to each of the selected connectivity providers 142 that are to provide the network path to be used by the client. In the depicted embodiment, for example, activation request 414A is sent to provider 142A, and activation request 142B is sent to provider 142B. An activation request 414 to a given provider 142 may include identifications of the endpoints (e.g., endpoint 461A and 461B) between which the given provider is to establish a network path for the client, as well as details of a service level agreement (SLA) 466 governing the terms of service (such as the performance, availability, pricing of the network connection or segment being activated). In some implementations, the endpoint information included in the activation request 414 may specify precise details such as a data center street address, the data center room in which the endpoint are located, the specific rack within the room, and/or the specific hardware port to be used. In other implementations, fewer specific details may be included in the activation request, allowing the connectivity provider 142 to make some of the lower-level decisions such as which rack/device/port to use. The granularity at which service level information is specified in the SLA 466 may also vary from one implementation to another. In some implementations, if a multi-stage activation is required, e.g., if in a first stage a new physical link is to be provisioned and in subsequent stage(s) the connection is to be logically activated, a different activation request may be transmitted by the connectivity coordinator 114 for each stage. In other implementations, even if multi-stage activation is required, a single activation request 414 may suffice, e.g., the connectivity provider 142 may implement each of the activation stages in response to a single activation request 414. In some embodiments, after the one or more network segments needed for client connectivity to the provider network have been set up, the connectivity coordinator 114 may execute one or more tests to ensure that the network path is working as expected—e.g., one or more data transfers may be attempted to check the bandwidth and/or latency characteristics of the established paths. As part of network establishment, in some embodiments one or more routing table entries may have to be propagated to various network devices (e.g., routers of the provider network or external networks).

After the connectivity is established, the client 148 may be notified, e.g., by the connectivity coordinator 114 using a programmatic interface, and the client 148 may begin using the network path as desired. At some point, e.g., because of anticipated changes in client workload or measured trends of network usage, the client 148 may wish to change some of the characteristics of the connectivity, such as the supported bandwidth or latency. In such a scenario, the client 148 may submit a connection modification request to the connectivity coordinator 114 in some embodiments, indicating the desired changes, and the connectivity coordinator 114 may in turn transmit its own modification request 418 to the appropriate connectivity providers 142. In some cases, the request may be straightforward enough that a single modification request 418 may suffice. In other cases, if for example a requested increase in maximum supported bandwidth is going to result in a change to the price the client is to pay, there may be several interactions between the coordinator 114, the provider(s) 142, and the client 148 in order to effect the changes. In some embodiments, a client 148 may request changes that require non-trivial analysis by the coordinator 114—e.g., the client may wish to reduce the amount being paid for connectivity to the provider network, and may request the coordinator 114 to provide some options for reducing costs. In such scenarios, the coordinator 114 may look up network service offering metadata it has collected for various providers, and try to determine whether some provider combinations may be able to provide the client connectivity at a lower price, with slightly reduced performance, for example. If such providers are found, the coordinator 114 may notify the client of the choices available. If the client agrees to use one of the provider combinations that can provide the more economical connectivity, the coordinator may initiate termination of the existing connection, followed by activation of the new connection, in each case using operational APIs supported by the appropriate connectivity providers in some embodiments.

In at least some embodiments, in addition to modifying various properties of their network connections, clients 148 may be able to request dynamic disablement and enablement of connectivity. For example, in some scenarios a given client 148 may need connectivity to the provider network only for some hours in a week, and may wish to reduce costs by disabling connectivity during the hours it is not required, and enabling it again as needed. In such scenarios, the client 148 may submit connection disablement/enablement requests to the connectivity coordinator 114 in some embodiments, and the connectivity coordinator 114 may transmit corresponding requests using the operational APIs of the connectivity providers involved to disable/enable the network paths as requested. In at least one embodiment, in addition to or instead of serving as the intermediary between the clients 148 and the connectivity providers 142, the connectivity coordinator 114 (and/or the connectivity providers 142) may make some subset or all of the operational APIs of the providers available for direct use by the clients 148. In such embodiments, the client may be able to issue connection modification requests, disablement/enablement requests directly to the connectivity providers instead of transmitting them to the connectivity coordinator 114.

Methods for Service Metadata Collection and Connectivity Management

Figure 5:
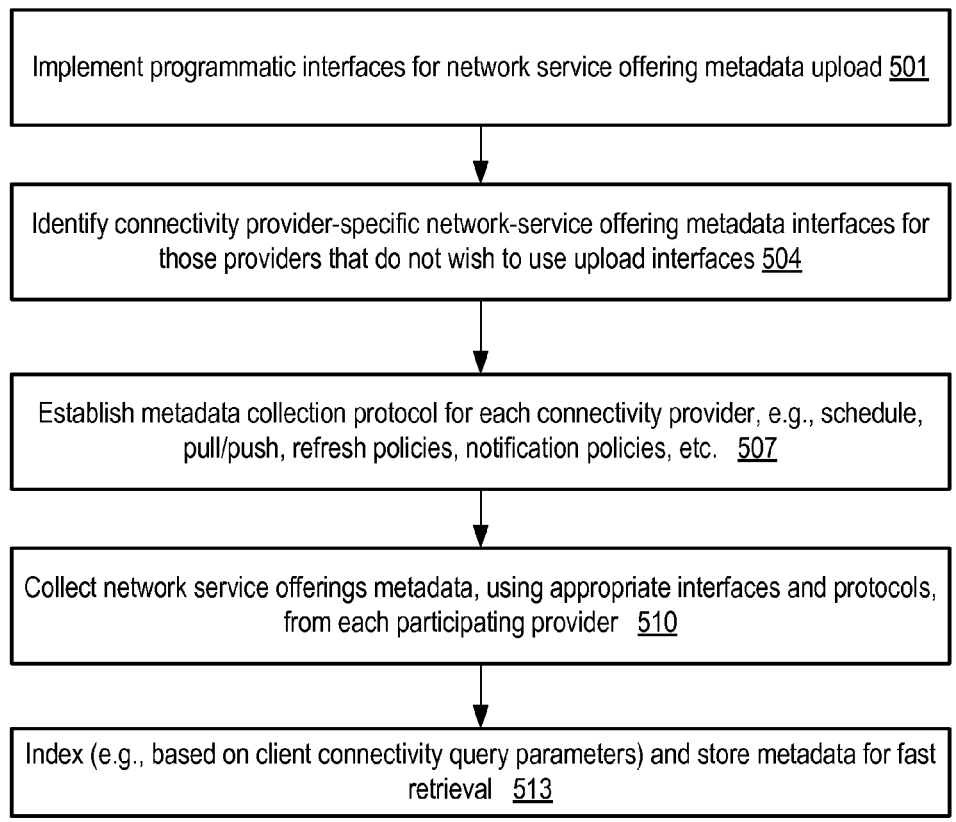
FIG. 5 is a flow diagram illustrating aspects of the operation of a connectivity coordinator configured to collect network service offering metadata from a plurality of connectivity providers, according to at least one embodiment.

FIG. 5 is a flow diagram illustrating aspects of the operation of a connectivity coordinator 114 configured to collect network service offering metadata of a plurality of connectivity providers 142, according to at least one embodiment. As shown in element 501 of FIG. 5, the coordinator may define and/or implement one or more programmatic interfaces (e.g., API sets, web pages, graphical user interfaces, and/or command line tools) allowing connectivity providers 142 to upload network service offering metadata. As shown in element 504, the coordinator 114 may also identify provider-specific interfaces (e.g., interfaces defined/implemented by a set of providers 142 that do not wish to utilize the interfaces implemented by the connectivity coordinator) in the depicted embodiment. In some embodiments, only coordinator-defined interfaces may be used (e.g., all the connectivity providers may be willing to use the upload interfaces supported by the coordinator), while in other embodiments the coordinator may be configured to use provider-implemented interfaces (e.g., there may be no need for a coordinator-implemented upload interface).

The coordinator 114 may establish metadata collection protocols for each of the connectivity providers for which programmatic interfaces (of either type, e.g., coordinator-defined or provider-defined interfaces) are available (element 507). The protocol for a given provider may include such parameters as how often metadata about the service offerings is to be refreshed, which party (e.g., either the coordinator or the provider) is to initiate the metadata transfer, update notification policies (e.g., which, if any, changes to properties of existing network service offerings should trigger notifications to the coordinator, and how soon such notifications are to be provided), and so on. The coordinator 114 may start collecting the metadata from the connectivity providers 142, using the appropriate programmatic interfaces and protocols (element 510). The collected metadata may in some embodiments be processed (e.g., by converting information received in different formats from the different connectivity providers, into a common shared format), indexed and stored in a persistent repository (element 513) such as database 115. Indexes may be created on those metadata attributes that are encountered most frequently in client connectivity queries in some embodiments. In some implementations, at least a portion of the network service offering metadata may be collected using e-mail, FTP transfers, or other techniques instead of, or in addition to, using programmatic interfaces such as APIs or web pages.

Figure 6:
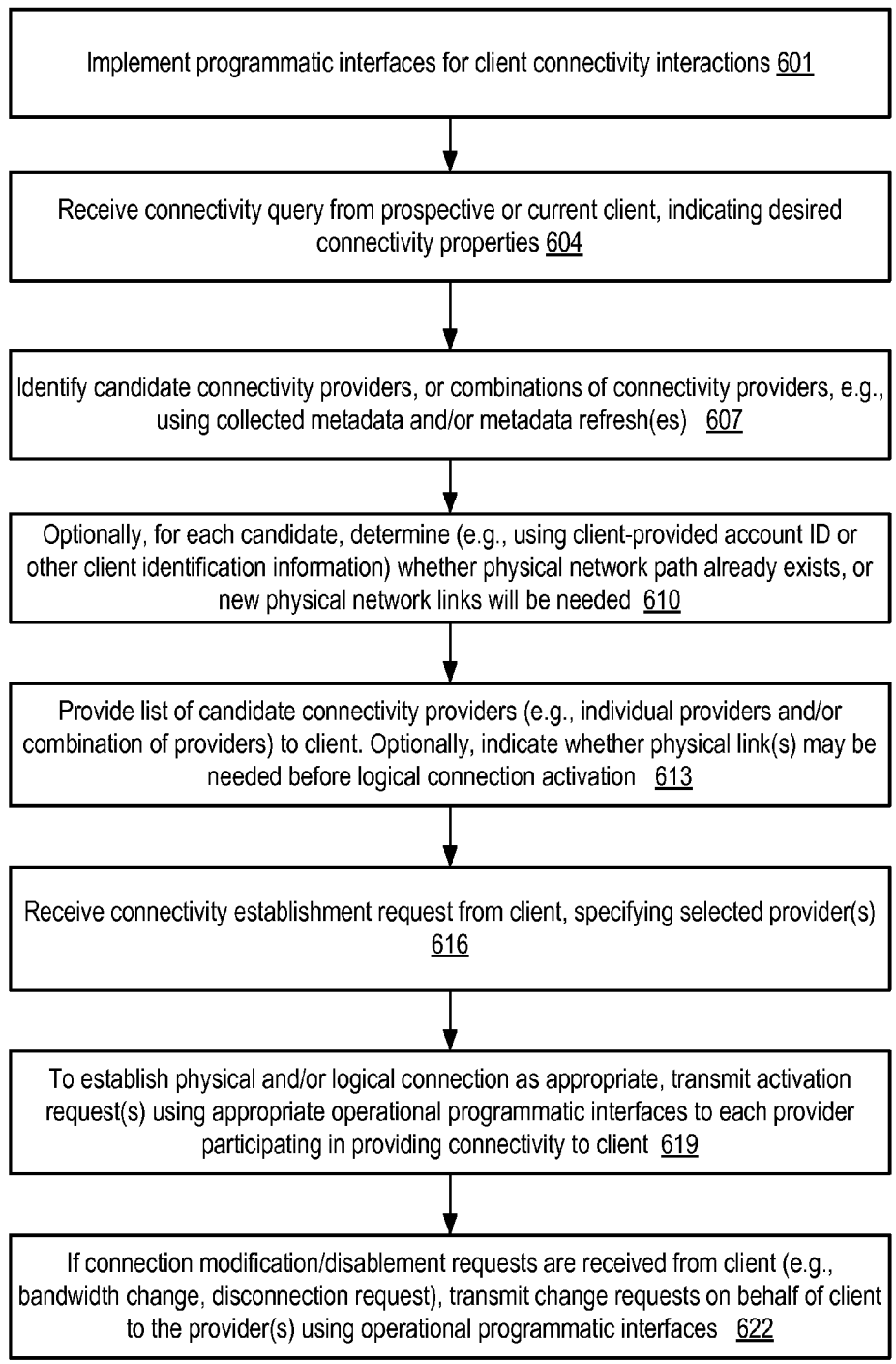
FIG. 6 is a flow diagram illustrating aspects of the operation of a connectivity coordinator related to establishment and management of network connectivity between a client network and a provider network, according to at least one embodiment.

FIG. 6 is a flow diagram illustrating aspects of the operation of a connectivity coordinator 114 related to establishment and management of network connectivity between a client network and a provider network, according to at least one embodiment. As shown in element 601, the coordinator 114 may define and/or implement one or more programmatic interfaces (such as web pages, APIs, command-line tools or GUIs) for client interactions related to connectivity establishment and administration. The coordinator 114 may receive a connectivity query from a current or prospective client 148, transmitted in accordance with one of the programmatic interfaces (element 604). The query may indicate a number of characteristics or parameters of the desired connectivity, such as the location(s) from which (or to which) connectivity is desired, the networking performance (e.g., bandwidth or latency) required, the price the client is willing to pay, and so on. Some of the parameters may be designated as mandatory, while others may be designated as preferences which the coordinator is expected to make a best effort to meet.

Based on the parameters specified in the connectivity query, and using at least a portion of the metadata collected from various connectivity providers 142, the coordinator 114 may identify candidate providers that may be suitable for the client to use (element 607). In some cases, the coordinator may refresh a portion of the network service offering metadata in real time, e.g., after the connectivity query is received, to identify candidate providers. Some candidate providers may be able to implement the entire network path needed by the client, while in other cases a path may have to be assembled using discrete network segments from several different providers 142. In at least one embodiment, the coordinator may optionally determine whether the physical networking infrastructure (e.g., the appropriate networking cables, switches, etc.) is already in place for the desired connectivity (element 610). For example, the client may already be using some services provided by a particular connectivity provider 142, and as a result, physical links connecting the client network to an external network owned/managed by the particular connectivity provider 142 may already have been set up. The client 148 may provide identification information such as an account identifier (of an account previously set up with a connectivity provider), client data center location, or client office location to the coordinator 114 in some embodiments, e.g., using one of the programmatic interfaces implemented by the coordinator. The coordinator 114 may use the client identification information and/or the client's business entity name to submit a query to the connectivity provider 142 to determine whether previously set up physical infrastructure can be used to implement at least a portion of a network path between the client network and the connectivity provider, or whether one or more new physical links or devices are needed. If existing infrastructure components can be used, this may reduce the turnaround time needed for the client's connection, as only logical activation of the connection may be required.

The coordinator 114 may respond to the client's connectivity query with a list or collection of candidate connectivity providers usable by the client (element 613 of FIG. 6). The list may include groups of providers that can collectively provide the desired network path(s), and/or individual providers that can implement the desired connectivity. Various details about the service offerings of the candidates may be provided to the client in some embodiments, such as pricing estimates for the requested connectivity, ratings or satisfaction levels based on feedback from other customers of the providers, the estimated time at which the connectivity can be established, and so on. In one embodiment, the coordinator 114 may include an indication of whether a new physical link is needed before the desired connection can be logically activated. In at least some implementations, when multiple candidate providers are found, the coordinator may sort the list of candidates according to one or more client-specified criteria and/or coordinator-selected criteria, such as estimated price, connectivity establishment times, customer satisfaction ratings, and so on.

After the client receives the list of candidate connectivity providers, the client may select one of the candidates (e.g., either a single provider or a combination of providers) to implement the connection, and send a connectivity establishment request specifying the selection to the coordinator 114 in the illustrated embodiment. When the coordinator 114 receives the connectivity establishment request (element 616), it may initiate establishment of the requested connectivity, e.g., by transmitting connection activation requests using one or more operational programmatic interfaces supported by the selected connectivity providers (element 619). Connection activation may involve multiple phases, such as physical link establishment followed by logical connection establishment in some embodiments, and several different operational requests may have to be sent to the connectivity providers in such embodiments. The connectivity provider may receive notifications from the connectivity providers when the connection has been established (or when each of the different network segments has been activated). In some implementations, the coordinator 114 may execute one or more verification tests to check whether the network path is functional and/or whether it can support traffic with the desired performance characteristics. After the connection has been established, the coordinator 114 may inform the client 148 that the requested connection is available for client use.

If the client 148 wishes to modify (e.g., by increasing the maximum bandwidth) or disable the connection at some point, the client may send a connection modification/disablement request to the coordinator 114 in the illustrated embodiment. Upon receiving the request, the coordinator may in turn transmit an appropriate connection change request to one or more of the selected connectivity providers that own/manage the network path(s) that were established at the client's request. The coordinator 114 may use one or more of the operational APIs supported by the connectivity providers to request the connection modification or disablement.

In at least one embodiment, the connectivity coordinator 114 may also serve as a billing intermediary between the connectivity providers 142 and clients 148. For example, each of the connectivity providers 142 implementing a portion of the client's network connection to the provider network may transmit respective billing statements to the coordinator 114 for each successive billing period in such an embodiment, and the coordinator may present a consolidated bill to the client 148. In some embodiments, the consolidated bill may exclude details of how the total billing amount is split between the various providers involved, while in other embodiments, details of how much each provider is charging may be included in the consolidated bill. It is noted that in some embodiments the operations illustrated in FIG. 5 and FIG. 6 may be performed in a different order than that shown, and some of the illustrated operations may be performed in parallel in different embodiments. For example, one component of the coordinator 114 may collect network service offering metadata, while other components respond in parallel to client queries and connectivity establishment requests in some embodiments.

Example Web Interface for Connectivity Queries

FIG. 7 illustrates a portion of an example web-based interface that may be implemented to allow clients 148 to submit connectivity queries, according to some embodiments. As shown, the interface includes a web page 700 including a message area 703 and several form elements that the client 148 may use to specify various parameters of the desired connection. Using element 705, the client 148 may indicate the location (e.g., street address, city, state, postal code and country, or a CLLI code if one is available) for the client network endpoint to be connected to the provider network. In the depicted example, the client may also indicate desired provider network location via an address or CLLI code using element 707. Instead of specifying the provider network location, the client may indicate (e.g., using the option "You select the optimal direct connect site" of element 707) that the coordinator is to select a provider network endpoint location for the connection, e.g., based on the client endpoint location and the other parameters specified by the client.

The client may use element 709 to indicate a desired bandwidth for data transfer over the connection. Element 711 may be used to indicate by when the client wants the connection activated, and for how long the client wishes to retain the connection once it is established. For example, the client may click on the link labeled "six months" to change the duration for which the connection is requested, and the link labeled "as soon as possible" to change the connection establishment time target in the depicted example. Using element 713, the client may enter additional requirements, such as high availability requirements (e.g., paired or redundant network paths), isolation requirements (e.g., dedicated network links, not shared by other clients) and the like in the embodiment shown.

Element 715 may be used by the client to indicate a pricing constraint, such as the maximum price per gigabyte of data transferred over the network connection. In the depicted web page 700, the client may also indicate (using element 717) one or more account identifiers for previously-established client accounts with one or more connectivity providers, to enable the coordinator 114 to determine whether networking infrastructure that may have already been set up, originally for purposes other than connections to the provider network, may now be usable for providing the requested connectivity to the provider network. Button 719 may be used to submit the query to the coordinator in the illustrated embodiment. In different embodiments, some of the elements shown in FIG. 7 may be excluded from web-based interfaces provided to the client, or other elements may be added. In at least one embodiment a client may have the option of using a web-based interface similar to that shown in FIG. 7, or using a different interface such as a command line tool or a script/program with API calls.

Figure 8:
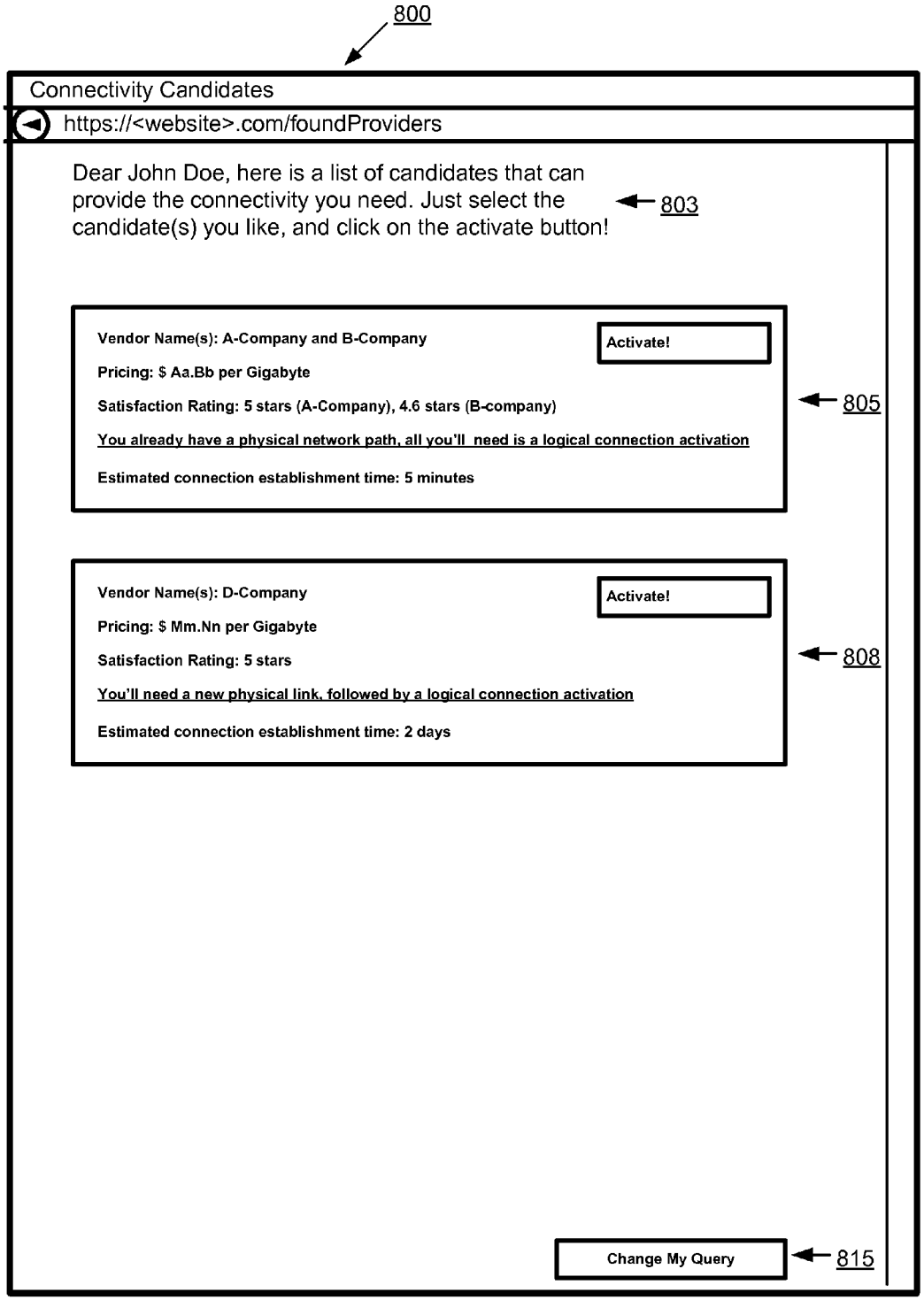
FIG. 8 illustrates a portion of an example web-based interface that may be used to provide clients with results of connectivity queries, according to some embodiments.

FIG. 8 illustrates a portion of an example web-based interface that may be used to provide clients with results of connectivity queries, according to some embodiments. As shown, the interface includes a web page 800 with a message area 803, and a listing of several candidate connectivity providers that meet some or all of the client's connectivity requirements or preferences. In the illustrated example, the coordinator 114 has listed two sets of candidate providers that were found, based on the criteria specified by the client. As shown in element 805, the first set of candidate connectivity providers comprises vendors "A-Company" and "B-Company" that can collectively provide the network paths(s) requested by the client, while element 808 shows that the second set of candidates includes a single provider "D-Company". Each of the listing elements, 805 and 808, include respective pricing information for the requested connectivity, as well as a customer satisfaction rating for the respective providers. The customer satisfaction rating may have been determined based on feedback received by the connectivity coordinator 114 from other clients for which it served as an intermediary with the various connectivity providers in some embodiments.

The displayed information also includes an estimated connection establishment time for each candidate set in the depicted example, as well as an indication of whether a new physical link is required or not. In the case of the provider combination "A-Company" and "B-Company", element 805 indicates that the client already has a physical network path available, and that only logical connection activation is required (this may contribute to the short establishment time estimate of five minutes). In contrast, in the case of candidate provider "D-Company", element 808 indicates that a new physical link is needed before the logical connection can be activated. The client may change the query that was submitted by clicking on button 815 in the depicted example. In different embodiments, when presenting the list of candidates to the client, the coordinator 114 may sort the candidates based on different criteria—e.g., based on price, establishment time, or a criterion that can be selected or changed by the client. In some embodiments, more service details, or different combinations of service details, may be provided for each of the candidate sets than are shown in the illustrated example of FIG. 8. Upon viewing the list of candidates, the client 148 may transmit a connectivity establishment request to the connectivity coordinator by clicking on the button labeled "Activate!" for the selected candidate set in the depicted embodiment. In at least some embodiment, further interactions, such as the client's acceptance of a service agreement prepared by the various connectivity providers, may be required before connections are actually set up.

Use Cases

The techniques described above of centralizing and automating the collection of network service offering metadata from various connectivity providers, and implementing easy-to-use client interfaces for connectivity queries, connection enablement, disablement and modifications, may be used in a variety of environments. For example, in geographical regions where well-established connectivity providers have already set up substantial networking infrastructure, the provider network operator may wish to partner with as many such third-party providers as possible, so that the provider network operator does not itself have to incur the costs of implementing additional infrastructure. In addition, in cases where a provider network operator already provides a set of interfaces for managing computation and/or storage resources allocated to clients, the implementation of additional interfaces for connectivity queries and connection management may have several benefits. For example, the potential reduction in turnaround times for connection setup, teardown and modification may attract large numbers of new customers for the provider network operator as well as the connectivity providers. In addition, the use of such interfaces may also result in reduced costs for some or all of the parties involved.

Illustrative Computer System

Figure 9:
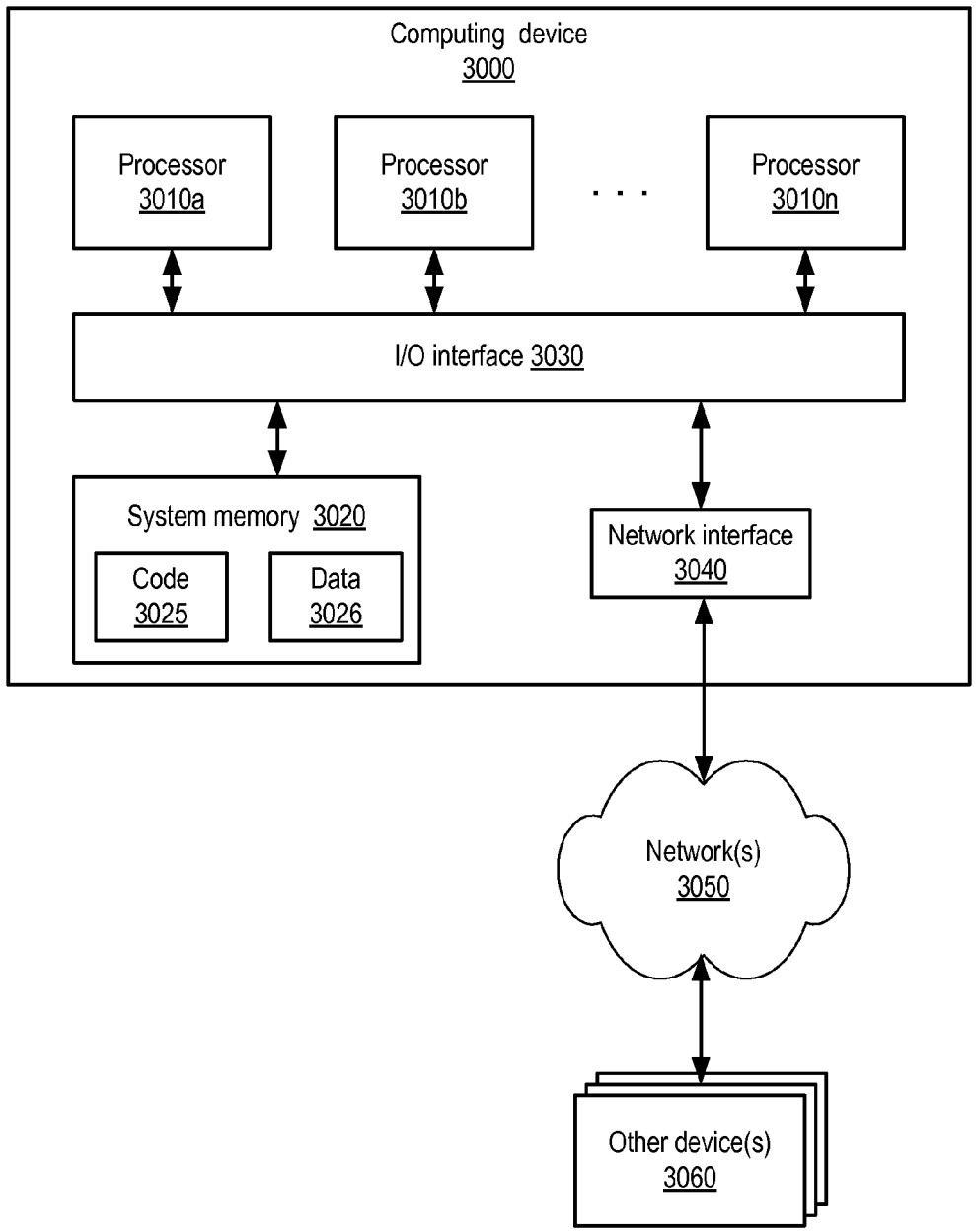
FIG. 9 is a block diagram illustrating an example computing device that may be used in some embodiments.

In at least some embodiments, a server that implements a portion or all of one or more of the technologies described herein, including the techniques to implement the functionality of the connectivity coordinator, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a plurality of computing devices configured to implement resources of a provider network, wherein the resources are configurable for network access from client devices via one or more provider network endpoints; and
one or more computing devices configured to:
collect, using a first set of one or more programmatic interfaces, network service offering metadata from a plurality of connectivity providers;
wherein one or more of the plurality of connectivity providers control physical infrastructure configured to provide at least a portion of a network path between a client network and at least one of the one or more provider network endpoints;
receive a connectivity query from a client via a first connection, wherein the connectivity query indicates one or more client connectivity parameters for a desired dedicated private network path between the client network and the at least one of the one or more provider network endpoints, wherein the first connection is established at least in part via one or more public network paths;
in response to the connectivity query indicating the one or more client connectivity parameters, identify, using at least a portion of the network service offering metadata, a collection of one or more connectivity providers of the plurality of connectivity providers for providing physical connectivity for the desired dedicated private network path from the client network and a provider network endpoint in accordance with the one or more client connectivity parameters;
provide to the client a list of connectivity providers from the collection of connectivity providers for providing the physical connectivity from the client network to the provider network endpoint of the one or more provider network endpoints in accordance with the one or more client connectivity parameters;

receive a connectivity establishment request from the client, wherein the connectivity establishment request indicates a selection of one or more of the plurality of connectivity providers selected to implement the desired dedicated private network path from the client network to the at least one of the one or more provider network endpoints; and in response to the connectivity establishment request indicating the one or more selected connectivity providers of the collection, initiate, using a second set of one or more programmatic interfaces, an activation of the desired dedicated private network path over a physical network connection from the client network to a selected provider network endpoint of the one or more provider network endpoints via the one or more selected connectivity providers, wherein traffic that is not generated on behalf of the client is not transmitted over the physical network connection from the client network to the selected provider network endpoint of the dedicated private network path, wherein operation of at least one physical network link used for the physical network connection is implemented by a particular connectivity provider of the one or more selected connectivity providers that controls physical infrastructure configured to provide the physical network link to the selected provider network endpoint.

2. The system as recited in claim 1, wherein the network service offering metadata collected from a first connectivity provider of the plurality of connectivity providers includes one or more of:
(a) a geographical coverage specification indicating physical locations to which, and from which, the connectivity provider can provide connectivity
(b) a bandwidth capacity specification
(c) a network latency specification
(d) a network hardware infrastructure specification
(e) a supported network protocol specification
(f) network path establishment time specification or
(g) connectivity pricing policies.

3. The system as recited in claim 1, wherein the one or more client connectivity parameters include one or more of:
(a) a geographical location of one or more network devices of the client network from which connectivity to the provider network is to be established
(b) a preferred provider network endpoint to which connectivity is to be established
(c) an indication that a private, unshared physical network link is to be used for connectivity to the provider network
(d) a target bandwidth capacity between the client network and the provider network
(e) a target network latency between the client network and the provider network
(f) a target network path establishment time
(g) a preferred type of network hardware link
(h) a preferred networking protocol or
(i) a client pricing constraint for connectivity to the provider network.

4. The system as recited in claim 1, wherein to identify the collection of one or more connectivity providers, the one or more computing devices are further operable to:
identify a first connectivity provider and a second connectivity provider of the plurality of connectivity providers such that (a) the first connectivity provider is capable of providing physical connectivity from the client network to a first network device of the second connectivity provider and
(b) the second connectivity provider is capable of providing at least a portion of a network path from the first network device to at least one provider network endpoint; and
(c) provide an indication that a group of connectivity providers comprising the first and second connectivity providers is collectively capable of providing physical connectivity from the client network to the provider network.

5. The system as recited in claim 1, wherein, in response to the connectivity query, the one or more computing devices are further operable to:
determine whether a physical network path has previously been established between the client network of a particular client from which the connectivity query was received, and a particular provider network endpoint by one or more connectivity providers of the plurality of connectivity providers;
in response to determining that a physical network path has not been established, provide an indication to the particular client that a physical network path is to be established before a logical network connection can be activated to enable the requested connectivity; and
in response to determining that a physical network path has been established, provide an indication to the particular client that a logical network connection is to be activated to enable the requested connectivity.

6. The system as recited in claim 1, wherein the one or more computing devices are further operable to:
in response to a connection modification request received from a client after the network connection has been activated, use a particular programmatic interface to transmit, to the particular connectivity provider, a request to change one or more properties of the network connection.

7. A method, comprising:
collecting, using a first set of one or more programmatic interfaces, network service offering metadata from a plurality of connectivity providers, wherein one or more of the plurality of connectivity providers control physical infrastructure configured to provide at least a portion of a network path from a client network of a client to at least one of the one or more endpoints of a provider network;
receive a connectivity query from a client via a first connection, wherein the connectivity query indicates one or more client connectivity parameters for a desired dedicated private network path between the client network and the at least one of the one or more provider network endpoints, wherein the first connection is established at least in part via one or more public network paths;
in response to the connectivity from the client, providing to the client, using at least a portion of the network service offering metadata, an indication of a set of one or more connectivity providers of the plurality of connectivity providers for providing physical connectivity for the desired dedicated private network path from the client network to a provider network endpoint of the one or more provider network endpoints in accordance with the one or more properties, wherein traffic that is not generated on behalf of the client is not transmitted over physical infrastructure used for the desired dedicated private network path from the client network to the provider network endpoint.

8. The method as recited in claim 7, further comprising:
in response to a connectivity establishment request, initiating, using a second set of one or more programmatic interfaces, an activation of a network connection between the client network and the provider network, wherein at least one network link used for the network connection is operated by a particular connectivity provider of the one or more connectivity providers included in the set of one or more connectivity providers.

9. The method as recited in claim 7, wherein the network service offering metadata collected from a first connectivity provider of the plurality of connectivity providers includes one or more of:
   (a) a geographical coverage specification indicating physical locations to which, and from which, the connectivity provider can provide connectivity
   (b) a bandwidth capacity specification
   (c) a network latency specification
   (d) a network hardware infrastructure specification
   (e) a supported network protocol specification
   (f) network path establishment time specification or
   (g) connectivity pricing policies.

10. The method as recited in claim 7, wherein the one or more properties include one or more of:
   (a) a geographical location of one or more network devices of the client network from which connectivity to the provider network is to be established
   (b) a preferred provider network endpoint to which connectivity is to be established
   (c) an indication that a dedicated physical network link is to be used for connectivity to the provider network
   (d) a target bandwidth capacity between the client network and the provider network
   (e) a target network latency between the client network and the provider network
   (f) a target network path establishment time
   (g) a preferred type of networking hardware link
   (h) a preferred networking protocol or
   (i) a client pricing constraint for connectivity to the provider network.

11. The method as recited in claim 7, wherein said providing to the client, an indication of a set of one or more connectivity providers of the plurality of connectivity providers for providing physical connectivity comprises:
   identify a first connectivity provider and a second connectivity provider of the plurality of connectivity providers such that
      (a) the first connectivity provider is capable of providing physical connectivity from the client network to a first network device of the second connectivity provider and
      (b) the second connectivity provider is capable of providing at least a portion of a network path between the first network device and at least one provider network endpoint; and
   indicating to the client that a group of connectivity providers comprising the first and second connectivity providers is collectively capable of providing physical connectivity from the client network to the provider network.

12. The method as recited in claim 7, further comprising:
   in response to the connectivity query,
      determining whether a physical network path has been established between the client network and the particular provider network by one or more connectivity providers of the plurality of connectivity providers;
      in response to determining that a physical network path has not been established, indicating to the client that a physical network path is to be established before a logical network connection can be activated to enable the requested connectivity; and
      in response to determining that a physical network path has been established, indicating to the client that a logical network connection is to be activated to enable connectivity between the client network and the provider network.

13. The method as recited in claim 12, wherein said determining whether a physical network path has been established comprises transmitting, to a first connectivity provider of the plurality of connectivity providers, a query indicating identification information of the client.

14. The method as recited in claim 7, further comprising:
   in response to a connection modification request received from the client, using a particular programmatic interface to transmit, to the particular connectivity provider, a request to change one or more properties of the network connection established between the client network and the provider network.

15. The method as recited in claim 7, further comprising:
   implementing, as part of a connectivity coordination service of the provider network, a network service offering metadata upload application programming interface (API), wherein the set of one or more programmatic interfaces comprises the network service offering metadata upload API;
   wherein said collecting comprises receiving network service offering metadata from at least one connectivity provider in accordance with the network service offering upload API.

16. The method as recited in claim 7, wherein the set of one or more programmatic interfaces comprises at least one network service offering metadata query API implemented by a first connectivity provider of the plurality of connectivity providers, wherein said collecting comprises receiving a result of a network service offering query transmitted to the first connectivity provider.

17. A non-transitory computer-accessible storage medium storing program instructions that when executed on one or more processors:
   collect, using a first set of one or more programmatic interfaces, network service offering metadata from a plurality of connectivity providers, wherein one or more of the plurality of connectivity providers control physical infrastructure configured to provide at least a portion of a network path from a client network of a client to at least one of the one or more endpoints of a provider network;
   receive a connectivity query from a client via a first connection, wherein the connectivity query indicates one or more client connectivity parameters for a desired dedicated private network path between the client network and the at least one of the one or more provider network endpoints, wherein the first connection is established at least in part via one or more public network paths;
   in response to the connectivity query from the client, identify one or more connection providers of the plurality connectivity providers for providing physical connectivity for the desired dedicated private network path from the client network and a provider network endpoint of the one or more provider network endpoints in accordance with the one or more properties, wherein traffic that is not generated on behalf of the client is not transmitted over physical infrastructure used for the desired dedicated private network path from the client network to the provider network endpoint.

18. The storage medium as recited in claim 17, wherein the instructions when executed on the one or more processors:
    in response to a connectivity establishment request, initiate, using a second set of one or more programmatic interfaces, an activation of a network connection between the client network and the provider network, wherein at least one network link used for the network connection is operated by a particular connectivity provider of the one or more connectivity providers identified.

19. The storage medium as recited in claim 18, wherein the second set of one or more programmatic interfaces comprises a first operational API implemented by the particular connectivity provider, and a second operational API implemented by a different connectivity provider, wherein to initiate the activation of the network connection, the instructions are further operable to:
    transmit a first request formatted in accordance with the first operational API to the particular connectivity provider, and transmit a second request formatted in accordance with the second operational API to the different connectivity provider.

20. The storage medium as recited in claim 17, wherein the instructions when executed on the one or more processors:
    in response to the connectivity query,
        determine whether a physical network path has been established between the client network and the provider network by one or more connectivity providers of the plurality of connectivity providers;
        in response to determining that a physical network path has not been established, indicate to the client that a physical network path is to be established before a logical network connection can be activated to between the client network and the provider network; and
        in response to determining that a physical network path has been established, indicate to the client that a logical network connection is to be activated for connectivity between the client network and the provider network.

21. The storage medium as recited in claim 17, wherein the instructions when executed on the one or more processors:
    in response to a connection modification request received from the client, use a particular programmatic interface to transmit, to the particular connectivity provider, a request to change one or more properties of a network connection established between the client network and the provider network.

22. The storage medium as recited in claim 17, wherein the instructions when executed on the one or more processors:
    implement, as part of a connectivity coordination service of the provider network, a network service offering metadata upload application programming interface (API), wherein the set of one or more programmatic interfaces comprises the network service offering metadata upload API;
    wherein at least a portion of the network service offering metadata is collected in accordance with the network service offering upload API.

23. The storage medium as recited in claim 17, wherein the set of one or more programmatic interfaces comprises at least one network service offering metadata query API implemented by a first connectivity provider of the plurality of connectivity providers.

24. The storage medium as recited in claim 17, wherein the instructions when executed on the one or more processors:
    implement a second set of programmatic interfaces for client connectivity requests;
    wherein the connectivity query is received in accordance with the second set of programmatic interfaces.

25. The storage medium as recited in claim 17, wherein the one or more connectivity providers identified in response to the connectivity query comprise a plurality of connectivity providers, wherein the instructions are further executable to:
    provide to the client a sorted listing of the plurality of connectivity providers, in which the providers are sorted in accordance with one or more criteria specified by the client.

* * * * *